US012687961B2

(12) United States Patent
Kim et al.

(10) Patent No.: US 12,687,961 B2
(45) Date of Patent: Jul. 21, 2026

(54) STORAGE DEVICE INCLUDING VOLATILE MEMORY AND OPERATING METHOD THEREOF

(71) Applicant: SK hynix Inc., Gyeonggi-do (KR)

(72) Inventors: Dong-Gun Kim, Gyeonggi-do (KR);
Nam Hyun Yun, Gyeonggi-do (KR);
Hyeongju Na, Gyeonggi-do (KR);
Dong Sop Lee, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 19 days.

(21) Appl. No.: 18/928,200

(22) Filed: Oct. 28, 2024

(65) Prior Publication Data

US 2025/0362803 A1     Nov. 27, 2025

(30) Foreign Application Priority Data

May 27, 2024    (KR) ........................ 10-2024-0068591

(51) Int. Cl.
*G06F 3/06* (2006.01)
*G06F 12/06* (2006.01)

(52) U.S. Cl.
CPC .......... *G06F 3/0608* (2013.01); *G06F 3/0659* (2013.01); *G06F 3/0673* (2013.01)

(58) Field of Classification Search
CPC .... G06F 3/0608; G06F 3/0659; G06F 3/0673;
G06F 3/0679; G06F 3/0644; G06F 3/0652; G06F 3/0658; G06F 3/0638; G06F 3/0604; G06F 3/0647; G06F 12/06; G06F 2212/1016; G06F 2212/1044; G06F 2212/401

USPC .................................................. 711/154, 103
See application file for complete search history.

(56) References Cited

U.S. PATENT DOCUMENTS

| | | | |
|---|---|---|---|
| 10,999,223 B1 | 5/2021 | Jain et al. | |
| 2008/0005801 A1* | 1/2008 | Abdo .................... | H04L 65/752 |
| | | | 707/E17.009 |
| 2012/0131264 A1* | 5/2012 | Oikawa ............... | G06F 12/0246 |
| | | | 711/E12.008 |
| 2016/0110112 A1* | 4/2016 | Yeh ........................ | G06F 3/0679 |
| | | | 711/103 |
| 2021/0133922 A1* | 5/2021 | Kornienko ............ | G06T 3/4007 |
| 2022/0100707 A1* | 3/2022 | Zhao ....................... | G06F 16/13 |
| 2023/0236979 A1* | 7/2023 | Geng .................... | G06F 12/084 |
| | | | 711/118 |

FOREIGN PATENT DOCUMENTS

KR          10-2267477 B1      6/2021

* cited by examiner

*Primary Examiner* — Hashem Farrokh
(74) *Attorney, Agent, or Firm* — IP & T GROUP LLP

(57) ABSTRACT

A storage device comprising a volatile memory comprising a plurality of physical areas, a compression operation circuit configured to compress write data at a first rate to generate first compressed data, and a control operation circuit configured to divide the plurality of physical areas included in the volatile memory into first physical areas and second physical areas, store the first compressed data in the first physical areas, and store first logical information indicating an area storing the first compressed data, in a first selected area of the second physical areas.

22 Claims, 19 Drawing Sheets

HOST —— 102

Figure 2C:
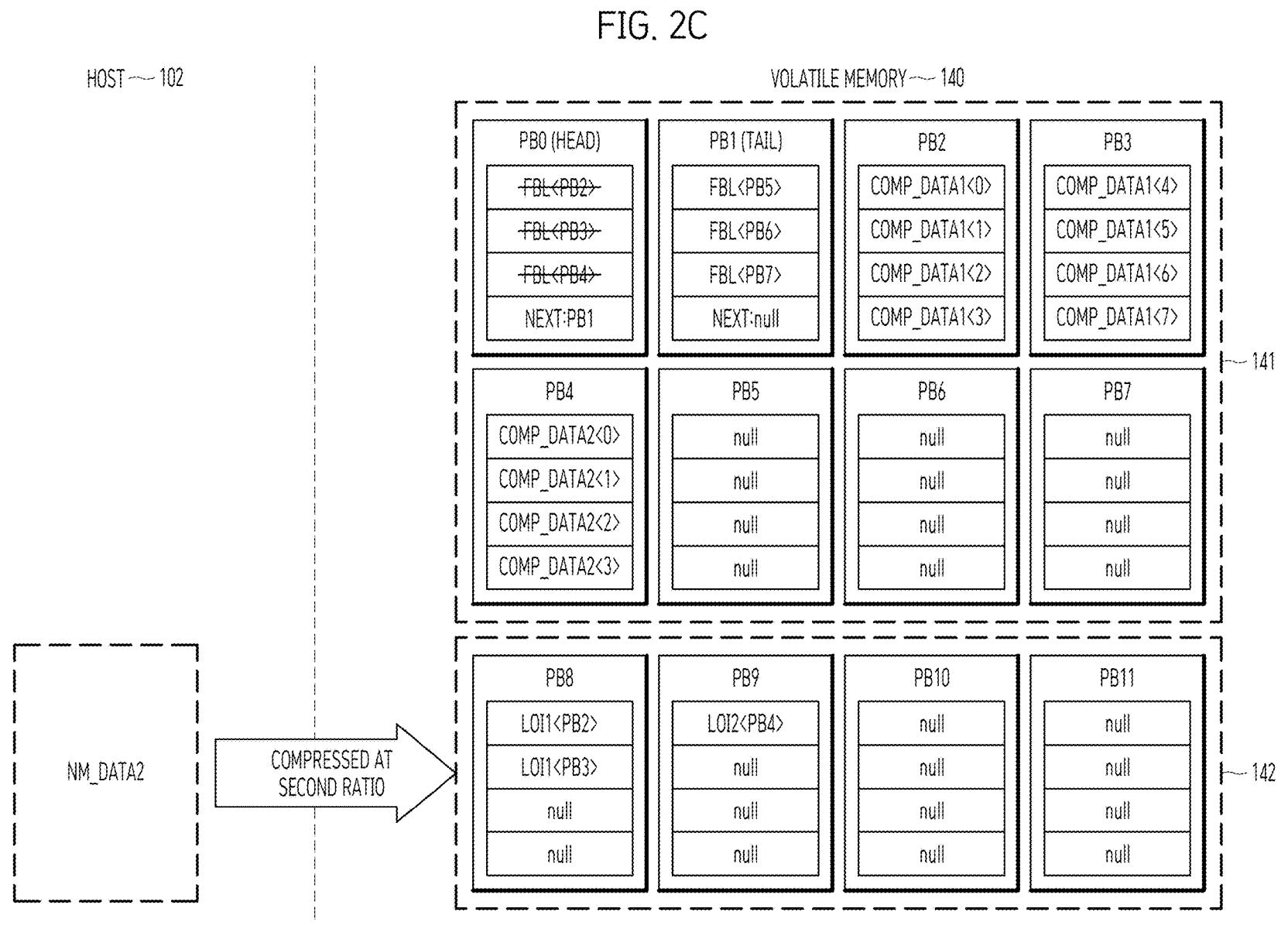

HOST ~ 102

VOLATILE MEMORY ~ 140

141

PB0 (HEAD)
| ~~FBL<PB2>~~ |
| ~~FBL<PB3>~~ |
| ~~FBL<PB4>~~ |
| NEXT:PB1 |

PB1 (TAIL)
| FBL<PB5> |
| FBL<PB6> |
| FBL<PB7> |
| NEXT:null |

PB2
| COMP_DATA1<0> |
| COMP_DATA1<1> |
| COMP_DATA1<2> |
| COMP_DATA1<3> |

PB3
| COMP_DATA1<4> |
| COMP_DATA1<5> |
| COMP_DATA1<6> |
| COMP_DATA1<7> |

PB4
| COMP_DATA2<0> |
| COMP_DATA2<1> |
| COMP_DATA2<2> |
| COMP_DATA2<3> |

PB5
| null |
| null |
| null |
| null |

PB6
| null |
| null |
| null |
| null |

PB7
| null |
| null |
| null |
| null |

142

PB8
| LOI1<PB2> |
| LOI1<PB3> |
| null |
| null |

PB9
| LOI2<PB4> |
| null |
| null |
| null |

PB10
| null |
| null |
| null |
| null |

PB11
| null |
| null |
| null |
| null |

COMPRESSED AT SECOND RATIO

NM_DATA2

HOST — 102

HOST —— 102

HOST — 102

VOLATILE MEMORY — 140

141

| PB0 | PB1 (HEAD) | PB2 | PB3 |
|---|---|---|---|
| null | null | COMP_DATA1<0> | COMP_DATA1<4> |
| null | FBL<PB6> | COMP_DATA1<1> | COMP_DATA1<5> |
| null | FBL<PB7> | COMP_DATA1<2> | COMP_DATA1<6> |
| null | NEXT:PB5 | COMP_DATA1<3> | COMP_DATA1<7> |

| PB4 | PB5 (TAIL) | PB6 | PB7 |
|---|---|---|---|
| COMP_DATA2<0> | FBL<PB0> | null | null |
| COMP_DATA2<1> | FBL<PB4> | null | null |
| COMP_DATA2<2> | null | null | null |
| COMP_DATA2<3> | NEXT:null | null | null |

142

| PB8 | PB9 | PB10 | PB11 |
|---|---|---|---|
| LOI1<PB2> | LOI2<PB4> | null | null |
| LOI1<PB3> | null | null | null |
| null | null | null | null |
| null | null | null | null |

LOI2 INVALIDATION REQUEST COMMAND

FIG. 3C

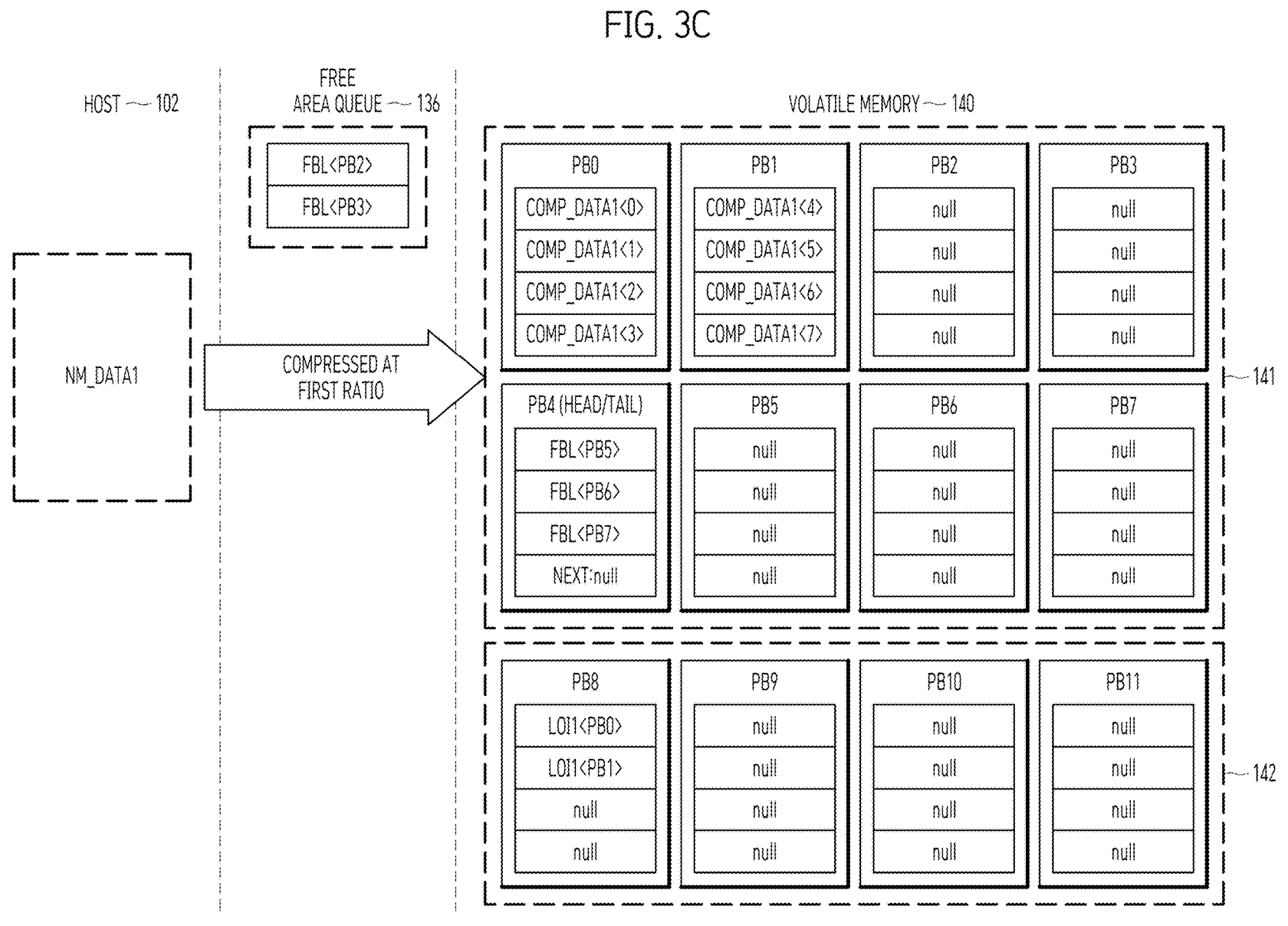

HOST ~ 102

NM_DATA1

COMPRESSED AT FIRST RATIO

FREE AREA QUEUE ~ 136

| FBL<PB2> | FBL<PB3> |
|---|---|

VOLATILE MEMORY ~ 140

141

PB0
| COMP_DATA1<0> |
| COMP_DATA1<1> |
| COMP_DATA1<2> |
| COMP_DATA1<3> |

PB1
| COMP_DATA1<4> |
| COMP_DATA1<5> |
| COMP_DATA1<6> |
| COMP_DATA1<7> |

PB2
| null |
| null |
| null |
| null |

PB3
| null |
| null |
| null |
| null |

PB4 (HEAD/TAIL)
| FBL<PB5> |
| FBL<PB6> |
| FBL<PB7> |
| NEXT:null |

PB5
| null |
| null |
| null |
| null |

PB6
| null |
| null |
| null |
| null |

PB7
| null |
| null |
| null |
| null |

142

PB8
| LO1<PB0> |
| LO1<PB1> |
| null |
| null |

PB9
| null |
| null |
| null |
| null |

PB10
| null |
| null |
| null |
| null |

PB11
| null |
| null |
| null |
| null |

FIG. 3G

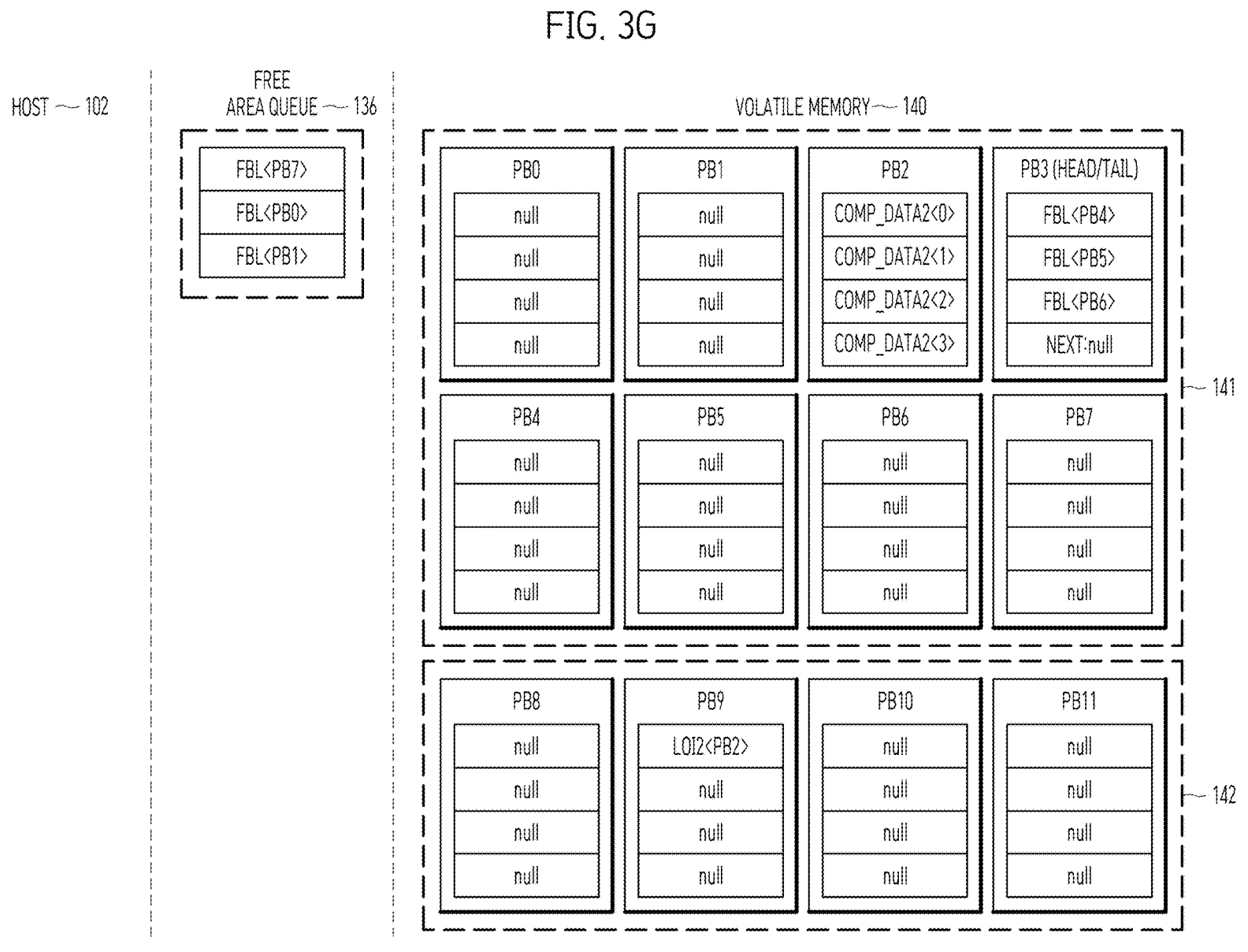

HOST ~ 102

FREE AREA QUEUE ~ 136

| FBL<PB7> |
|---|
| FBL<PB0> |
| FBL<PB1> |

VOLATILE MEMORY ~ 140

141

| PB0 | PB1 | PB2 | PB3 (HEAD/TAIL) |
|---|---|---|---|
| null | null | COMP_DATA2<0> | FBL<PB4> |
| null | null | COMP_DATA2<1> | FBL<PB5> |
| null | null | COMP_DATA2<2> | FBL<PB6> |
| null | null | COMP_DATA2<3> | NEXT:null |

| PB4 | PB5 | PB6 | PB7 |
|---|---|---|---|
| null | null | null | null |
| null | null | null | null |
| null | null | null | null |
| null | null | null | null |

142

| PB8 | PB9 | PB10 | PB11 |
|---|---|---|---|
| null | LOI2<PB2> | null | null |
| null | null | null | null |
| null | null | null | null |
| null | null | null | null |

FIG. 3I

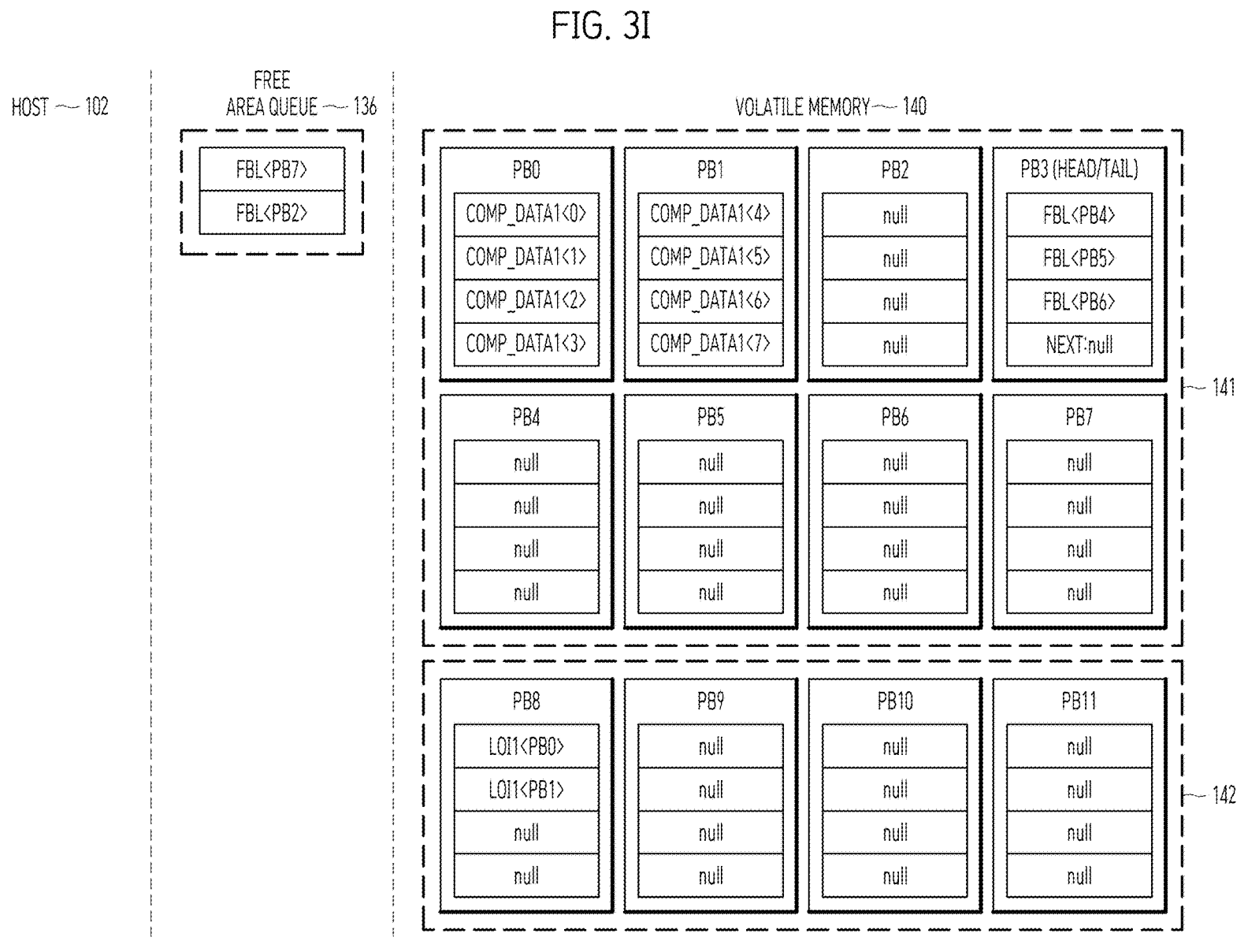

HOST — 102

FREE
AREA QUEUE — 136

| FBL<PB7> |
| FBL<PB2> |

VOLATILE MEMORY — 140

141

| PB0 | PB1 | PB2 | PB3 (HEAD/TAIL) |
|---|---|---|---|
| COMP_DATA1<0> | COMP_DATA1<4> | null | FBL<PB4> |
| COMP_DATA1<1> | COMP_DATA1<5> | null | FBL<PB5> |
| COMP_DATA1<2> | COMP_DATA1<6> | null | FBL<PB6> |
| COMP_DATA1<3> | COMP_DATA1<7> | null | NEXT:null |

| PB4 | PB5 | PB6 | PB7 |
|---|---|---|---|
| null | null | null | null |
| null | null | null | null |
| null | null | null | null |
| null | null | null | null |

142

| PB8 | PB9 | PB10 | PB11 |
|---|---|---|---|
| LOI<PB0> | null | null | null |
| LOI<PB1> | null | null | null |
| null | null | null | null |
| null | null | null | null |

STORAGE DEVICE INCLUDING VOLATILE MEMORY AND OPERATING METHOD THEREOF

CROSS-REFERENCE TO RELATED APPLICATION

This application claims priority under 35 U.S.C. § 119(a) to Korean Patent Application No. 10-2024-0068591, filed on May 27, 2024, the entire contents of which are incorporated herein by reference.

BACKGROUND

1. Field

Various embodiments of the present disclosure relate to a storage device, and more particularly, to a storage device including a volatile memory and an operating method thereof.

2. Discussion of the Related Art

Memory systems are storage devices embodied using a semiconductor such as silicon (Si), germanium (Ge), gallium arsenide (GaAs), indium phosphide (InP), or the like. The memory systems are classified into a volatile memory device and a nonvolatile memory device. The volatile memory device is a memory device in which data stored therein is lost when power supply is interrupted. Representative examples of the volatile memory device include static RAM (SRAM), dynamic RAM (DRAM), synchronous DRAM (SDRAM), etc. The nonvolatile memory device is a memory device in which data stored therein is retained even when power supply is interrupted. Representative examples of the nonvolatile memory device include a read only memory (ROM), a programmable ROM (PROM), an electrically programmable ROM (EPROM), an electrically erasable programmable ROM (EEPROM), a flash memory, a phase-change random access memory (PRAM), a magnetic RAM (MRAM), a resistive RAM (RRAM), a ferroelectric RAM (FRAM), etc. Flash memories are chiefly classified into a NOR-type memory and NAND-type memory.

A storage device may further include a controller for controlling a memory (for example, a volatile memory/a nonvolatile memory), and such a controller may receive a command from an external device, and perform data read, write, and erase operations on a memory included in the storage device based on the received command to control the operations.

On the other hand, the size of memory capacity required in a computing system continues to increase. In particular, in the case of a volatile memory having a higher price per capacity than a nonvolatile memory, increasing the size of memory capacity is more difficult.

Therefore, in a storage device including a volatile memory, a method for compressing and storing data stored in the volatile memory has been proposed.

SUMMARY

Various embodiments of the present disclosure are directed to providing a storage device that can compress write data and store the compressed data in an internal volatile memory and an operating method thereof.

Technical problems to be solved by the present disclosure are not limited to the aforementioned technical problems and other unmentioned technical problems will be clearly understood by those skilled in the art from the following description.

In an embodiment of the present disclosure, a storage device may include: a volatile memory comprising a plurality of physical areas; a compression operation circuit configured to compress write data at a first rate to generate first compressed data; and a control operation circuit configured to divide the plurality of physical areas included in the volatile memory into first physical areas and second physical areas, store the first compressed data in the first physical areas, and store first logical information indicating an area storing the first compressed data, in a first selected area of the second physical areas.

In an embodiment of the present disclosure, an operating method of a storage device including a volatile memory, the operating method may include: compressing write data at a first rate to generate first compressed data; dividing a plurality of physical areas included in the volatile memory into first physical areas and second physical areas; storing the first compressed data in the first physical areas; and storing first logical information indicating an area storing the first compressed data in a first selected area of the second physical areas.

Embodiments of the present disclosure can divide a plurality of physical areas included in a volatile memory inside a storage device into first physical areas for storing compressed data and second physical areas for storing logical information indicating the compressed data stored in the first physical areas, and manage the first physical areas and the second physical areas.

In particular, embodiments of the present disclosure can independently manage the positions of the second physical areas, where corresponding logical information is stored, according to a compression ratio for the compressed data.

Through this, the compressed data stored in the volatile memory can be effectively accessed.

BRIEF DESCRIPTION OF THE DRAWINGS

FIGS. 2A to 2G are diagrams for describing an operation in which a storage device in accordance with a first embodiment of the present disclosure stores compressed data in an internal volatile memory and manages the stored compressed data.

FIGS. 3A to 3I are diagrams for describing an operation in which a storage device in accordance with a second embodiment of the present disclosure stores compressed data in an internal volatile memory and manages the stored compressed data.

DETAILED DESCRIPTION

Figure 1A:
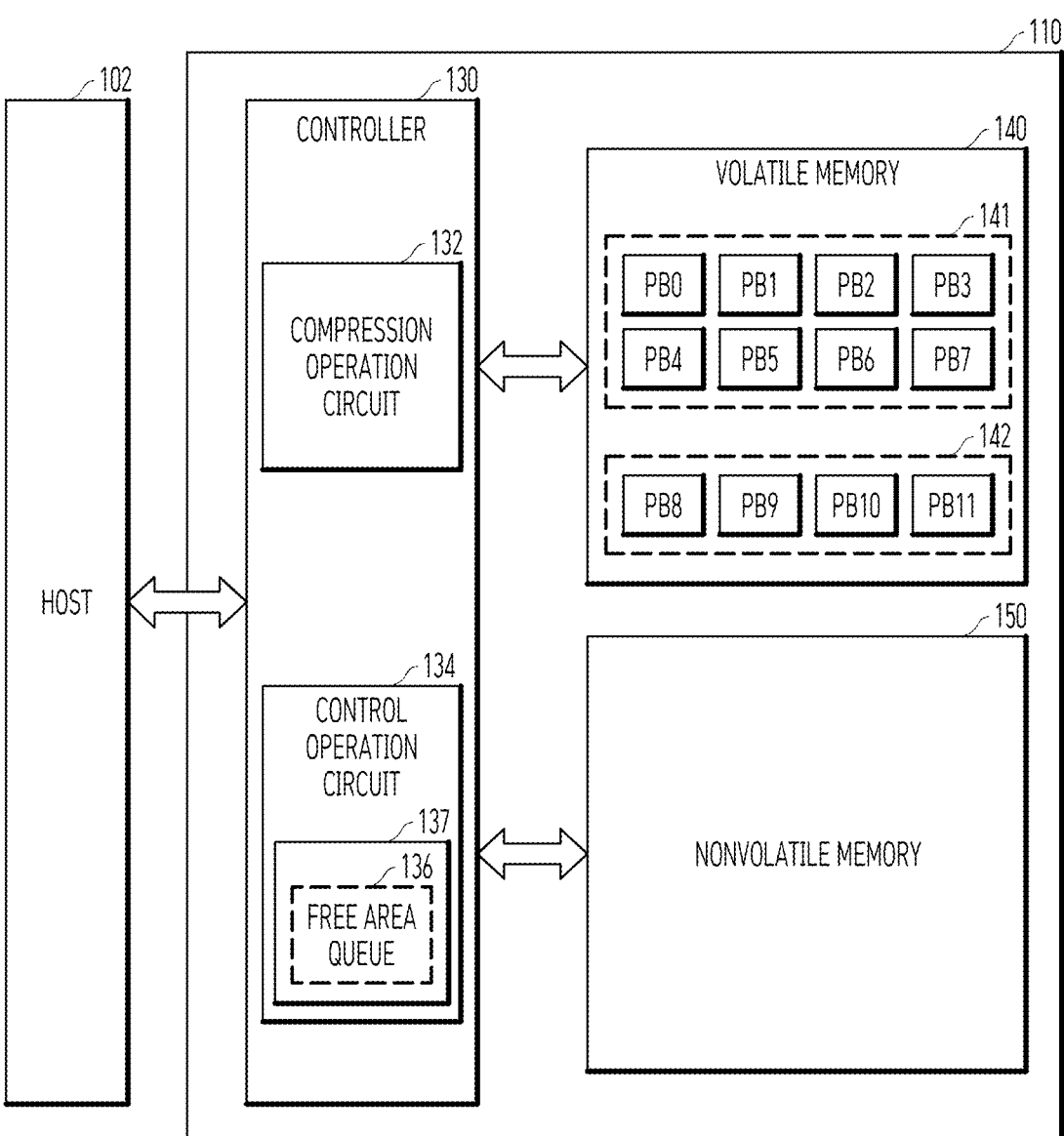
FIGS. 1A to 1C are diagrams for describing a data processing system including a storage device in accordance with an embodiment of the present disclosure.

Various embodiments of the present disclosure are described below with reference to the accompanying drawings. Elements and features of this disclosure, however, may be configured or arranged differently to form other embodiments, which may be variations of any of the disclosed embodiments.

In this disclosure, references to various features (e.g., elements, structures, modules, components, steps, operations, characteristics, etc.) included in "one embodiment," "example embodiment," "an embodiment," "another embodiment," "some embodiments," "various embodiments," "other embodiments," "alternative embodiment," and the like are intended to mean that any such features are included in one or more embodiments of the present disclosure, but may or may not necessarily be combined in the same embodiments.

In this disclosure, the terms "comprise," "comprising," "include," and "including" are open-ended. As used in the appended claims, these terms specify the presence of the stated elements and do not preclude the presence or addition of one or more other elements. The terms in a claim do not foreclose the apparatus from including additional components (e.g., an interface unit, circuitry, etc.).

In this disclosure, various units, circuits, or other components may be described or claimed as "configured to" perform a task or tasks. In such contexts, "configured to" is used to connote structure by indicating that the blocks/units/circuits/components include structure (e.g., circuitry) that performs one or more tasks during operation. As such, the block/unit/circuit/component can be said to be configured to perform the task even when the specified block/unit/circuit/component is not currently operational (e.g., is not turned on nor activated). The block/unit/circuit/component used with the "configured to" language includes hardware—for example, circuits, memory storing program instructions executable to implement the operation, etc. Additionally, "configured to" can include a generic structure (e.g., generic circuitry) that is manipulated by software and/or firmware (e.g., an FPGA or a general-purpose processor executing software) to operate in a manner that is capable of performing the task(s) at issue. "Configured to" may also include adapting a manufacturing process (e.g., a semiconductor fabrication facility) to fabricate devices (e.g., integrated circuits) that implement or perform one or more tasks.

As used in this disclosure, the term 'circuitry' or 'logic' refers to all of the following: (a) hardware-only circuit implementations (such as implementations in only analog and/or digital circuitry) and (b) combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions and (c) circuits, such as a microprocessor(s) or a portion of a microprocessor(s), that require software or firmware for operation, even if the software or firmware is not physically present. This definition of 'circuitry' or 'logic' applies to all uses of this term in this application, including in any claims. As a further example, as used in this application, the term "circuitry" or "logic" also covers an implementation of merely a processor (or multiple processors) or a portion of a processor and its (or their) accompanying software and/or firmware. The term "circuitry" or "logic" also covers, for example, and if applicable to a particular claim element, an integrated circuit for a storage device.

As used herein, the terms "first," "second," "third," and so on are used as labels for nouns that the terms precede, and do not imply any type of ordering (e.g., spatial, temporal, logical, etc.). The terms "first" and "second" do not necessarily imply that the first value must be written before the second value. Further, although the terms may be used herein to identify various elements, these elements are not limited by these terms. These terms are used to distinguish one element from another element that otherwise have the same or similar names. For example, a first circuitry may be distinguished from a second circuitry.

Further, the term "based on" is used to describe one or more factors that affect a determination. This term does not foreclose additional factors that may affect a determination. That is, a determination may be solely based on those factors or based, at least in part, on those factors. For example, the phrase "determine A based on B." While in this case, B is a factor that affects the determination of A, such a phrase does not foreclose the determination of A from also being based on C. In other instances, A may be determined based solely on B.

Herein, an item of data, a data item, a data entry or an entry of data may be a sequence of bits. For example, the data item may include the contents of a file, a portion of the file, a page in memory, an object in an object-oriented program, a digital message, a digital scanned image, a part of a video or audio signal, metadata or any other entity which can be represented by a sequence of bits. According to an embodiment, the data item may include a discrete object. According to another embodiment, the data item may include a unit of information within a transmission packet between two different components.

Figure 1B:
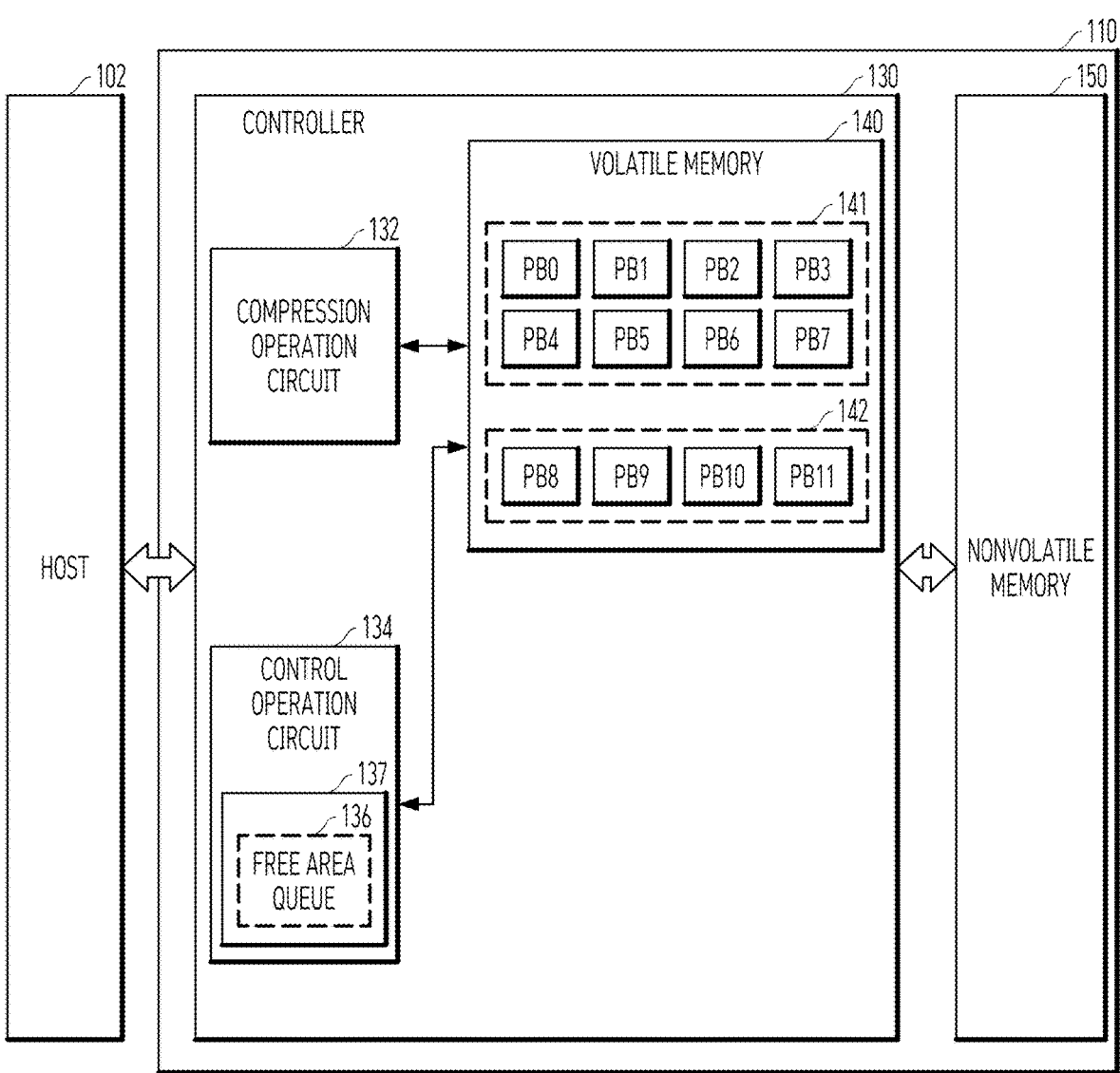
Figure 1C:
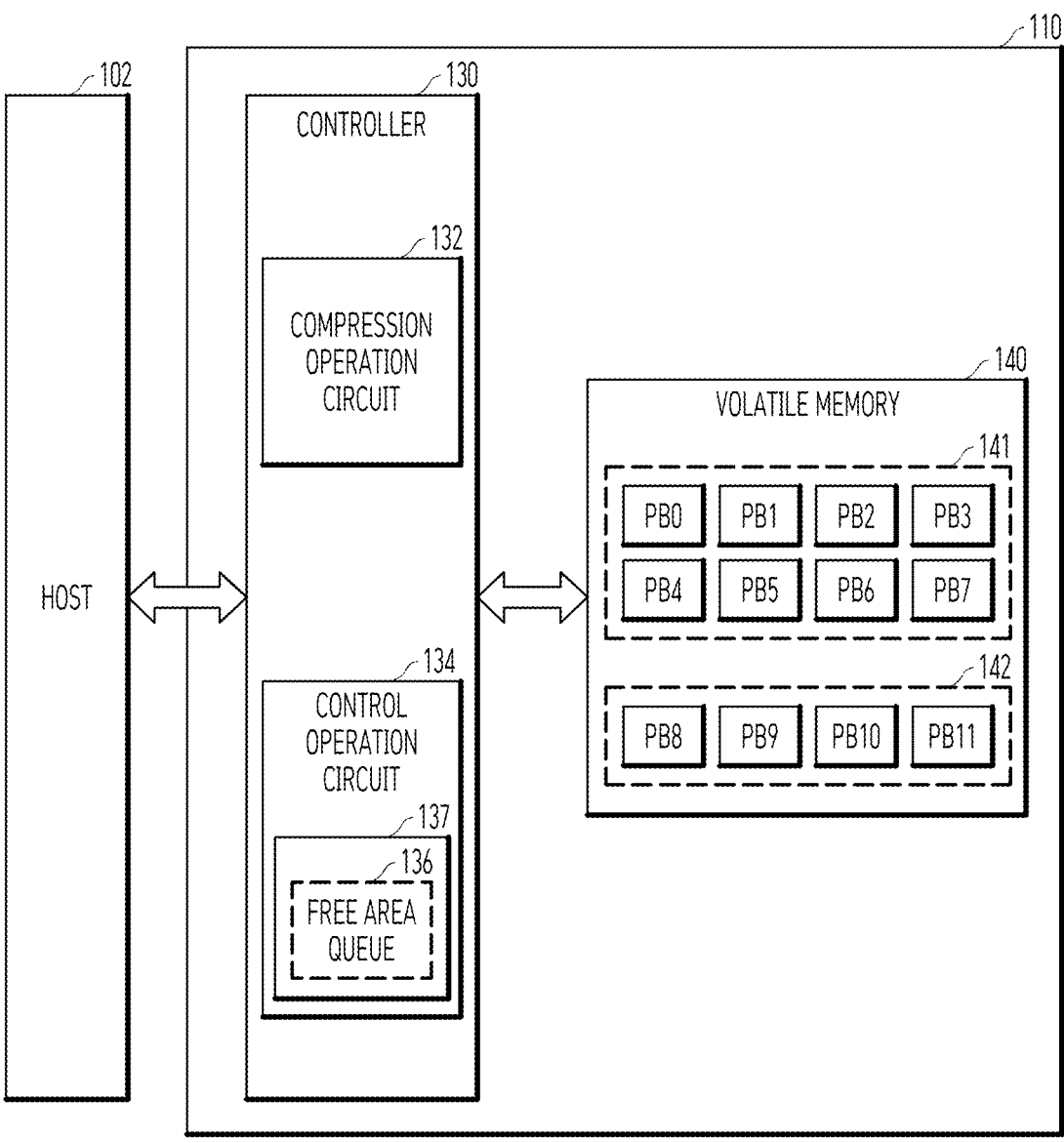

FIGS. 1A to 1C are diagrams for describing a data processing system including a storage device in accordance with an embodiment of the present disclosure.

Referring to FIG. 1A, the data processing system may include a host 102 engaged or coupled with a memory system, such as storage device 110. For example, the host 102 and the storage device 110 can be coupled to each other via a data bus, a host cable and the like to perform data communication.

The storage device 110 may include a memory device 140, 150 and a controller 130. The memory device 140, 150 and the controller 130 in the storage device 110 may be considered components or elements physically separate from each other. The memory device 140, 150 and the controller 130 may be connected via at least one data path. For example, the data path may include a channel and/or a way.

According to an embodiment, The memory device 140, 150 and the controller 130 may be components or elements functionally divided. Further, according to an embodiment, The memory device 140, 150 and the controller 130 may be implemented with a single chip or a plurality of chips. The controller 130 may perform a data input/output operation in response to a request input from the external device. For example, when the controller 130 performs a read operation in response to a read request input from an external device, data stored in a plurality of non-volatile memory cells included in the memory device 140, 150 is transferred to the controller 130.

The controller 130 may control the memory device 140, 150 to perform read, program and erase operations corresponding to commands inputted from the host 102, and the storage device 110 may independently perform the operations regardless of commands inputted from an external device such as the host 102.

Specifically, the memory devices 140 and 150 may include a volatile memory 140 and a nonvolatile memory 150.

In addition, the controller 130, the volatile memory 140, and the nonvolatile memory 150 may be physically separate components. The controller 130 and each of the volatile memory 140 and the nonvolatile memory 150 may be connected through at least one data path. For example, the data path may include channels and/or ways.

The controller 130 may be independently connected to each of the volatile memory 140 and the nonvolatile memory 150. For example, a first data path may be connected between the volatile memory 140 and the controller 130, a second data path may be connected between the nonvolatile memory 150 and the controller 130, and the first data path and the second data path may be physically separate.

On the other hand, the storage device 110 according to an embodiment of the present disclosure may not only be configured in the form illustrated in FIG. 1A, but may also be configured in the forms illustrated in FIGS. 1B and 1C.

That is, as illustrated in FIG. 1B, the volatile memory 140 of the memory devices 140 and 150 may be included inside the controller 130 and may be connected to other components 132 and 134 inside the controller 130 through a data bus, and the nonvolatile memory 150 may be configured to be connected through at least one data path outside the controller 130.

As illustrated in FIG. 1C, the storage device 110 may not include the nonvolatile memory 150, but may include only the volatile memory 140, and the volatile memory 140 may be connected to the controller 130 through a data path.

Referring to FIGS. 1A to 1C together, the storage device 110 according to an embodiment of the present disclosure may compress write data to generate compressed data, and manage the generated compressed data in the volatile memory 140. In such a case, the operation in which the volatile memory 140 manages the compressed data may mean that only the volatile memory 140 performs an access operation for the compressed data in a state in which the compressed data is stored in the volatile memory 140.

According to an embodiment, the write data may be data requested to be written from the host 102 to the storage device 110.

According to another embodiment, the write data may be data generated inside the controller 130 for the operation of the storage device 110.

In particular, even when the storage device 110 includes both the volatile memory 140 and the nonvolatile memory 150 as illustrated in FIGS. 1A and 1B, the storage device 110 according to an embodiment of the present disclosure may manage the compression data by using the volatile memory 140.

According to an embodiment, the storage device 110 may store the compressed data only in the volatile memory 140 without moving the compressed data to the nonvolatile memory 150, and then perform an access operation on the compressed data.

According to another embodiment, the storage device 110 stores the compressed data in both the nonvolatile memory 150 and the volatile memory 140, but stores the compressed data in the nonvolatile memory 150 for backup purposes. An access operation on the compressed data may be performed through the volatile memory 140.

Referring again to FIGS. 1A to 1C, the volatile memory 140 included in the storage device 110 may include a plurality of physical areas (i.e., memory areas) PB<0:11>.

The controller 130 included in the storage device 110 may include a compression operation circuit 132 and a control operation circuit 134.

The control operation circuit 134 may include an internal memory 137 allocated with a space for storing a free area queue 136. The internal memory 137 may have a relatively higher operating speed than the volatile memory 140. According to an embodiment, when the volatile memory 140 is DRAM, the internal memory 137 may be SRAM.

A first embodiment to be described below with reference to FIGS. 2A to 2G may be an embodiment corresponding to when the control operation circuit 134 controls the operation of the volatile memory 140 without using the free area queue 136. A second embodiment to be described with reference to FIGS. 3A to 31 may be an embodiment corresponding to when the control operation circuit 134 controls the operation of the volatile memory 140 while using the free area queue 136.

Specifically, the compression operation circuit 132 included in the controller 130 may generate compressed data by compressing write data. The write data may mean uncompressed original data, for example, raw data, and the compressed data may mean data obtained by compressing the write data through various compression algorithms such as LZ4, LZ4HC, and zStd.

The compression operation circuit 132 may vary a compression ratio depending on what value the write data has and what compression algorithm is used. According to an embodiment, the compression operation circuit 132 may generate first compressed data by compressing first write data at a first rate, and generate second compressed data by compressing second write data at a second rate higher than the first rate. In such a case, the first write data and the second write data may be data each having a set size. Accordingly, the size of the first compressed data compressed at the relatively low first rate may be larger than the size of the second compressed data compressed at the relatively high second rate.

The present disclosure describes an example of generating two types of compressed data by compressing the write data at two types of ratios; however, this is merely an embodiment and actually, more types of compressed data may be generated by compressing the write data at more types of ratios.

The control operation circuit 134 included in the controller 130 may divide the plurality of physical areas PB<0:11> included in the volatile memory 140 into a plurality of first physical areas 141 (PB<0:7>) and a plurality of second physical areas 142 (PB<8:11>).

According to an embodiment, the control operation circuit 134 may divide 8 physical areas PB<0:7> among 12 physical areas PB<0:11> into the first physical areas 141, and divide the remaining four physical areas PB<8:11> into the second physical areas 142, the 12 physical areas PB<0:11> being included in the volatile memory 140 as illustrated in the drawing.

The present disclosure describes an example in which the volatile memory 140 includes 12 physical areas; however, this is merely an embodiment and actually, the volatile memory 140 may include a larger number of physical areas. Likewise, the present disclosure describes an example in which among the 12 physical areas included in the volatile memory 140, 8 physical areas corresponding to ⅔ of the 12 physical areas are divided into first physical areas and the remaining four physical areas corresponding to ⅓ of the 12 physical areas are divided into second physical areas; however, this is merely an embodiment and actually, the plurality of physical areas included in the volatile memory 140 may be divided into first and second physical areas by applying various ratios.

The control operation circuit 134 may store each of the first compressed data and the second compressed data compressed at different compression ratios in the first physical areas 141 without overlapping each other.

According to an embodiment, the control operation circuit 134 may store the first compressed data in a first storage area (i.e., at least one of PB<0:7>) among free areas of the first physical areas 141, and store the second compressed data in a second storage area (i.e., at least one of PB<0:7>) not overlapping the first storage area among the free areas of the first physical areas 141.

The control operation circuit 134 may store first logical information and second logical information in the second physical areas 142 so as not to overlap each other, the first logical information indicating an area storing the first compressed data compressed at the first ratio among the first physical areas 141, the second logical information indicating an area storing the second compressed data compressed at the second ratio among the first physical areas 141. In particular, the control operation circuit 134 may determine an area in which logical information corresponding to compressed data is to be stored, according to a rate at which the compressed data has been compressed.

According to an embodiment, in the case of compressed data compressed at different ratios, the control operation circuit 134 may store corresponding logical information in different selected areas. That is, the control operation circuit 134 may store first logical information indicating the first storage area (i.e., at least one of PB<0:7>) storing the first compressed data compressed at the first ratio in a first selected area (i.e., at least one of PB<8:11>) of the second physical areas 142, and store second logical information indicating the second storage area (i.e., at least one of PB<0:7>) storing the second compressed data compressed at the second ratio in a second selected area (i.e., at least one of PB<8:11>) not overlapping the first selected area of the second physical areas 142.

According to another embodiment, in the case of compressed data compressed at the same rate, the control operation circuit 134 may store corresponding logical information in one selected area. That is, the control operation circuit 134 may store both first logical information indicating a first storage area storing first compressed data compressed at the first ratio and second logical information indicating a second storage area storing second compressed data compressed at the first ratio in the first selected area (i.e., at least one of PB<8:11>) among the second physical areas 142. On the other hand, the control operation circuit 134 may store both first logical information indicating a first storage area storing first compressed data compressed at the second rate and second logical information indicating a second storage area storing second compressed data compressed at the second rate in the second selected area (i.e., at least one of PB<8:11>) not overlapping the first selected area of the second physical areas 142.

When reading the compressed data stored in the volatile memory 140, the control operation circuit 134 may determine a selected area for searching for logical information, based on the size of the compressed data selected to be read, that is, based on a ratio at which the compressed data has been compressed. That is, when the compressed data selected to be read has a first size, the control operation circuit 134 may determine that the compressed data has been compressed at the first ratio and search for the logical information in the first selected area. On the other hand, when the compressed data selected to be read has a second size smaller than the first size, the control operation circuit 134 may determine that the compressed data has been compressed at the second ratio and search for the logical information in the second selected area.

The control operation circuit 134 may set some of the current number of free areas as management areas in order to store free area information on a free area capable of storing data among the first physical areas 141. In addition, the control operation circuit 134 may check the current number of free areas among the first physical areas 141, and vary the number of areas to be set as management areas among the current number of the free areas according to the checked current number of free areas. Accordingly, the control operation circuit 134 may use a variable number of free areas among the current number of free areas in order to store the free area information, and set the remaining number of free areas, excluding the variable number of free areas among the current number of free areas, as first or second storage areas and use the first or second storage areas in order to store first or second compressed data.

According to an embodiment, all eight physical areas PB<0:7> divided into the first physical areas 141 may be free areas. In such a case, the control operation circuit 134 may set two of the eight free areas as management areas, and store free area information on the remaining six free areas in the two physical areas set as management areas.

According to another embodiment, first or second compressed data is stored in four physical areas set as the first or second storage area among the eight physical areas PB<0:7> divided into the first physical areas 141 and only four physical areas are free areas. In such a case, the control operation circuit 134 may set one of the four free areas as a management area and then store free area information on the three free areas in one physical area included in the management area.

Subsequently, the control operation circuit 134 may manage some of the physical areas, which are set as management areas among the first physical areas 141, in the form of a linked list.

According to an embodiment, when two physical areas among the first physical areas 141 are set as management areas, the control operation circuit 134 may set one of the two physical areas set as the management areas as a header, set the other physical area as a tail, set next information next of the header to point to the tail, and set a 'null' value indicating the absence of a next area in the next information of the tail.

According to another embodiment, when one physical area among the first physical areas 141 is set as a management area, the control operation circuit 134 may set one physical area set as the management area as a header/a tail and set a 'null' value indicating the absence of a next area in the next information.

FIGS. 2A to 2G are diagrams for describing an operation in which the storage device in accordance with the first embodiment of the present disclosure stores compressed data in an internal volatile memory and manages the stored compressed data.

Referring to FIGS. 2A to 2G, the operation of the control operation circuit 134 that stores and manages compressed data in the volatile memory 140 without using the free area queue 136 may be described.

It can be seen that FIGS. 2A to 2G illustrate only the volatile memory 140 and the host 102 included in the storage device 110 among the components of the data processing system illustrated in FIGS. 1A to 1C. That is, it can be seen that the operation of the storage device 110 to be described below with reference to FIGS. 2A to 2G is based on the configuration of the storage device 110 described with reference to FIGS. 1A to 1C.

In FIGS. 2A to 2G, the volatile memory 140 includes 12 physical areas PB<0:11>, and 8 PB<0:7> of the 12 physical areas PB<0:11> are divided into the first physical areas 141 and the remaining four PB<8:11> are divided into the second physical areas 142. Each of the 12 physical areas PB<0:11> included in the volatile memory 140 includes four storage spaces. This is merely an example for convenience of description, and actually, a different number of physical areas and storage spaces may be set.

Figure 2A:
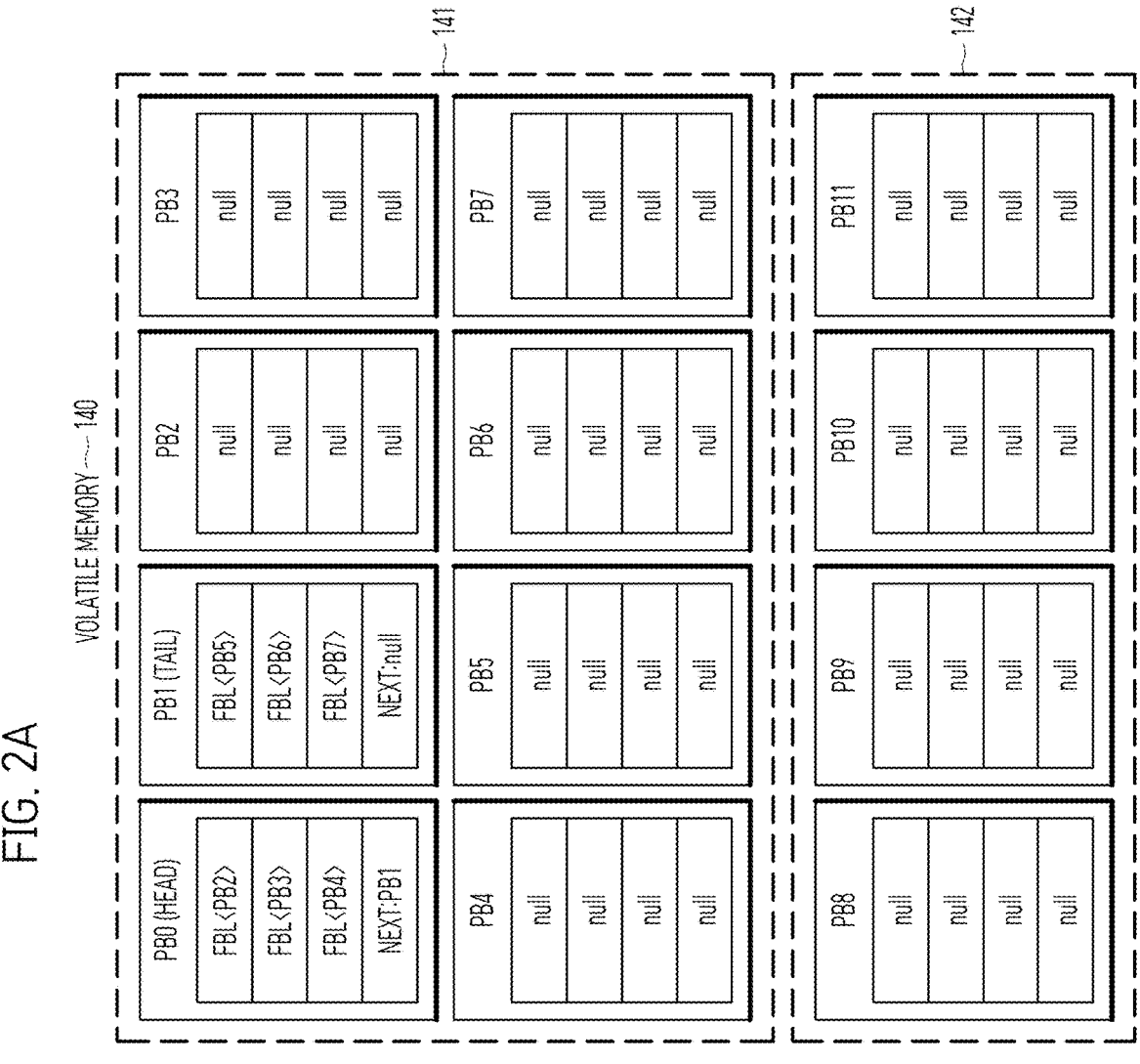

Referring to FIG. 2A, an initialization state of the storage device 110 can be seen. The initialization state of the storage device 110 may mean a state in which no compressed data is stored in the volatile memory 140.

Specifically, in the initialization state, the control operation circuit 134 included in the controller 130 may divide the plurality of physical areas PB<0:11> included in the volatile memory 140 into the first physical areas 141 and the second physical areas 142.

Subsequently, the control operation circuit 134 may check the current number of free areas included in the first physical areas 141, and set some of the current number of free areas as management areas according to the check result.

In the drawing, it can be seen that among the eight physical areas PB<0:7> included in the first physical areas 141, two physical areas PB<0:1> are set as management areas and the remaining six physical areas PB<2:7> are free areas.

However, at a time prior to the state illustrated in the drawing, that is, before the two physical areas PB<0:1> are set as management areas, all eight physical areas PB<0:7> included in the first physical areas 141 may have been free areas. In such a state, the control operation circuit 134 may set the two physical areas PB<0:1> as management areas, generate free area information indicating that the remaining six physical areas PB<2:7> are free areas, and store the generated free area information in the two physical areas PB<0:1> set as the management areas.

In addition, the control operation circuit 134 may manage the two physical areas PB<0:1> set as the management areas in the form of a linked list. That is, of the two physical areas PB<0:1> set as the management areas, the control operation circuit 134 may set a first management area PB0 as a header HEAD, set a second management area PB1 as a tail TAIL, set the second management area PB1 in next information NEXT of the first management area PB0 being the header HEAD, and set a 'null' value indicating the absence of a next area in next information NEXT of the second management area PB1 being the tail TAIL.

In the drawing, since the two physical areas PB<0:1> set as the management areas are managed in the form of a linked list, it can be seen that free area information indicating three free areas is stored in three of four storage spaces included in each of the two physical areas PB<0:1> and the remaining one storage space is used as a space for storing next information NEXT. Accordingly, it can be seen that six pieces of free area information is divided into three pieces of information FBL<PB2:4> and three pieces of information FBL<PB5:7> and the three pieces of information FBL<PB2:4> and the three pieces of information FBL<PB5:7> are stored in the two physical areas PB<0:1> set as the management areas, respectively.

Since no compressed data is stored in the first physical areas 141, the control operation circuit 134 may not store any logical data in the second physical areas 142.

Figure 2B:
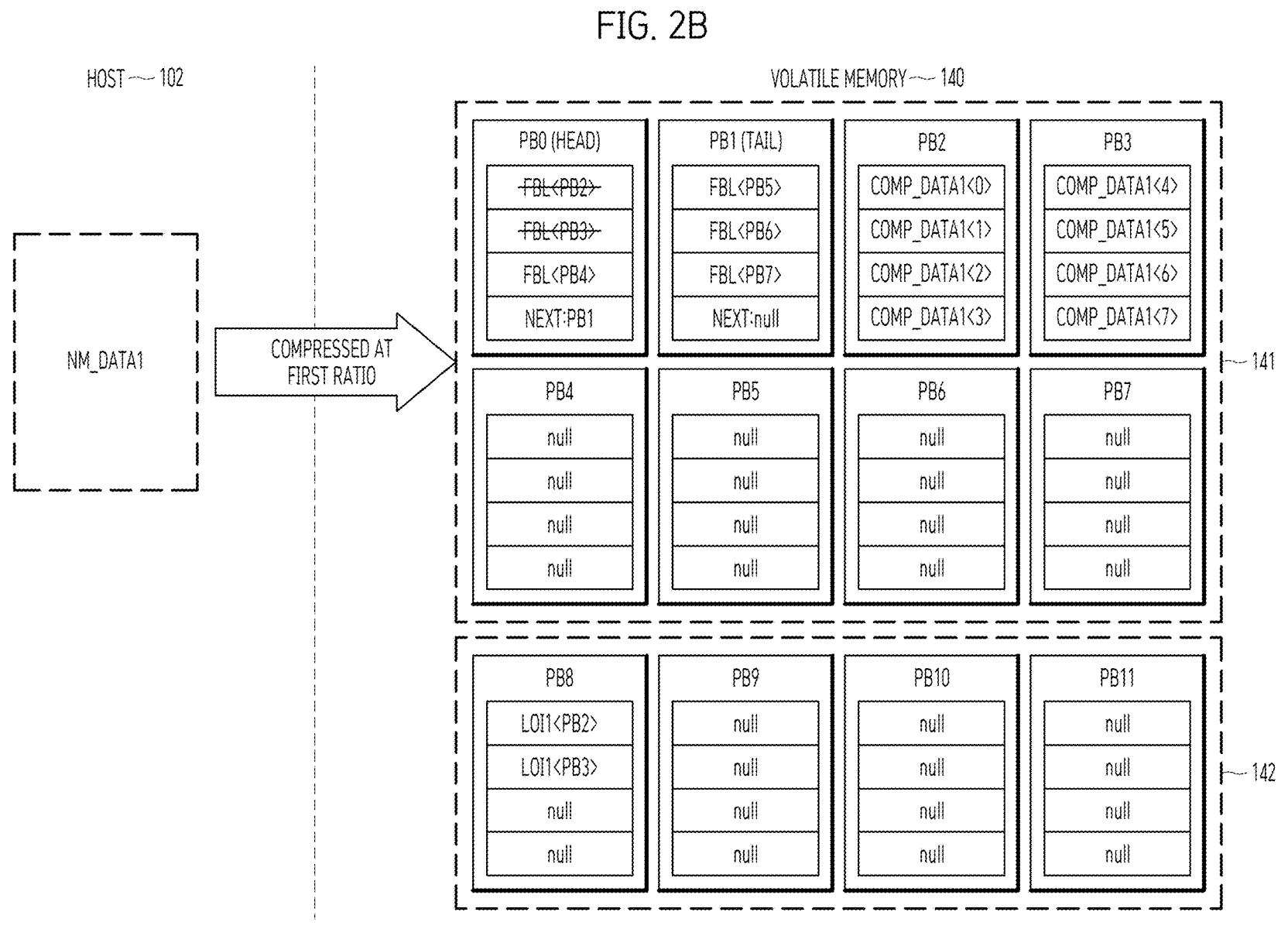

Referring to FIG. 2B, it can be seen how the storage device 110 manages first write data NM_DATA1 generated in the host 102 after the initialization state of the storage device 110 set in FIG. 2A.

Specifically, the compression operation circuit 132 included in the controller 130 may generate first compressed data COMP_DATA1<0:7> by compressing the first write data NM_DATA1 transmitted from the host 102 at a first ratio.

Subsequently, the control operation circuit 134 included in the controller 130 may refer to the free area information stored in the management area in order to store the first compressed data COMP_DATA1<0:7> in the volatile memory 140, and set two areas PB<2:3> of the six free areas PB<2:7> included in the first physical areas 141 as first storage areas. That is, the control operation circuit 134 may check that the first compressed data COMP_DATA1<0:7> includes 8 partial data (i.e., check that it exceeds 4 and is equal to or less than 8), and then set the two areas PB<2:3> among the current free areas PB<2:7> of the first physical areas 141 as the first storage areas.

In addition, the control operation circuit 134 may store the first compressed data COMP_DATA1<0:7> in the first storage areas PB<2:3>. That is, the control operation circuit 134 may divide eight partial data COMP_DATA1<0>, COMP_DATA1<1>, COMP_DATA1<2>, COMP_DATA1<3>, COMP_DATA1<4>, COMP_DATA1<5>, COMP_DATA1<6>, and COMP_DATA1<7> included in the first compressed data COMP_DATA1<0:7> into four partial data COMP_DATA1<0:3> and four partial data COMP_DATA1<4:7>, and store the four partial data COMP_DATA1<0:3> and the four partial data COMP_DATA1<4:7> in the two areas PB<2:3> set as the first storage areas, respectively.

In addition, the control operation circuit 134 may store the first compressed data COMP_DATA1<0:7> in the first storage areas, and then invalidate, from the management area, information FBL<PB2:3> corresponding to the first storage areas among the free area information. That is, the control operation circuit 134 may invalidate the information FBL<PB2:3> corresponding to the first storage areas and stored in two of the six storage spaces set in the two physical areas PB<0:1>, which have been set as the management areas, in order to store the free area information. According to an embodiment, the operation of invalidating information stored in the storage space may be an operation of overwriting the value of the storage space with a specific value, for example, a 'null' value. According to another embodiment, the operation of invalidating information stored in the storage space may be an operation of indicating that the value of the storage space is invalidated so that other data or information may be overwritten later.

In addition, the control operation circuit 134 may generate first logical information LOI1<PB2:3> indicating the two areas PB<2:3> set as the first storage areas, and store the first logical information LOI1<PB2:3> in a first selected area PB8 of the second physical areas 142. That is, the control operation circuit 134 may store two partial information LOI1<PB2> and LOI1<PB3> included in the first logical information LOI1<PB2:3> in two of four storage spaces included in the first selected area PB8, respectively.

Referring to FIG. 2C, it can be seen how second write data NM_DATA2 generated in the host 102 is managed in the storage device 110 after the first write data NM_DATA1 generated in the host 102 in FIG. 2B is stored in the first storage areas PB<2:3> of the volatile memory 140 as the first compressed data COMP_DATA1<0:7> compressed at the first ratio.

Specifically, the compression operation circuit 132 included in the controller 130 may generate second compressed data COMP_DATA2<0:3> by compressing the second write data NM_DATA2 transmitted from the host 102 at a second ratio. In such a case, as can be seen from the fact that the first compressed data COMP_DATA1<0:7> obtained by compressing the first write data NM_DATA1 at the first ratio includes 8 partial data and the second compressed data COMP_DATA2<0:3> obtained by compressing the second write data NM_DATA2 at the second ratio includes four partial data, it can be seen that the compression rate of the second ratio is higher than that of the first ratio.

Subsequently, in order to store the second compressed data COMP_DATA2<0:3> in the volatile memory 140, the control operation circuit 134 included in the controller 130 may refer to valid information FBL<PB4:7> of the free area information stored in the two physical areas PB<0:1> set as the management areas, and set one area PB4 of the four free areas PB<4:7> included in the first physical areas 141 as a second storage area. That is, the control operation circuit 134 may check that the second compressed data COMP_DATA2<0:3> includes four partial data (i.e., checks that it is 4 or less), and then set one area PB4 of the current free areas PB<4:7> of the first physical areas 141 as the second storage area.

In addition, the control operation circuit 134 may store the second compressed data COMP_DATA2<0:3> in the second storage area PB4. That is, the control operation circuit 134 may store four partial data COMP_DATA2<0>, COMP_DATA2<1>, COMP_DATA2<2>, and COMP_DATA2<3> included in the second compressed data COMP_DATA2<0:3> in the one area PB4 set as the second storage area.

In addition, the control operation circuit 134 may store the second compressed data COMP_DATA2<0:3> in the second storage area, and then invalidate, from the management area, information FBL<PB4> corresponding to the second storage area among the free area information. That is, the control operation circuit 134 may invalidate the information FBL<PB4> corresponding to the second storage area and stored in one of the six storage spaces set in the two physical areas PB<0:1>, which have been set as the management areas, in order to store the free area information. In such a case, the information FBL<PB2:3> corresponding to the first storage area among the six storage spaces set in order to store the free area information in the two physical areas PB<0:1> set as the management areas has already been invalidated in FIG. 2B. Accordingly, in FIG. 2C, all information FBL<PB2:4> corresponding to the first and second storage areas may be invalidated, the information FBL<PB2:4> being stored in three of the six storage spaces set in the two physical areas PB<0:1>, which have been set as the management areas, in order to store the free area information.

In addition, the control operation circuit 134 may generate second logical information LOI2<PB4> indicating one area PB4 set as the second storage area, and store the second logical information LOI2<PB4> in a second selected area PB9 of the second physical areas 142. That is, the second logical information LOI2<PB4> indicating the one area PB4 set as the second storage area may be stored in one of four storage spaces included in the second selected area PB9.

In such a case, even though only the first logical information LOI1<PB2:3> is stored in the first selected area PB8 described with reference to FIG. 2B and two storage areas are empty, the reason for storing the second logical information LOI2<PB4> in the second selected area PB9 in FIG. 2C is because the first compressed data COMP_DATA1<0: 7> stored in the first storage areas PB<2:3> indicated by the first logical information LOI1<PB2:3> is data obtained by compressing the first write data NM_DATA1 at the first ratio and the second compressed data COMP_DATA2<0:3> stored in the second storage area PB4 indicated by the second logical information LOI2<PB4> is data obtained by compressing the second write data NM_DATA2 at the second ratio.

That is, the control operation circuit 134 may distinguish areas for storing logical information indicating compressed data, according to the compression ratio of the write data used to generate the compressed data. That is, unlike in the drawing, when the second compressed data COMP_DATA2<0:3> is data obtained by compressing the second write data NM_DATA2 at the first ratio, the second logical information LOI2<PB4> indicating the second compressed data COMP_DATA2<0:3> may be stored in the first selected area PB8.

Figure 2D:
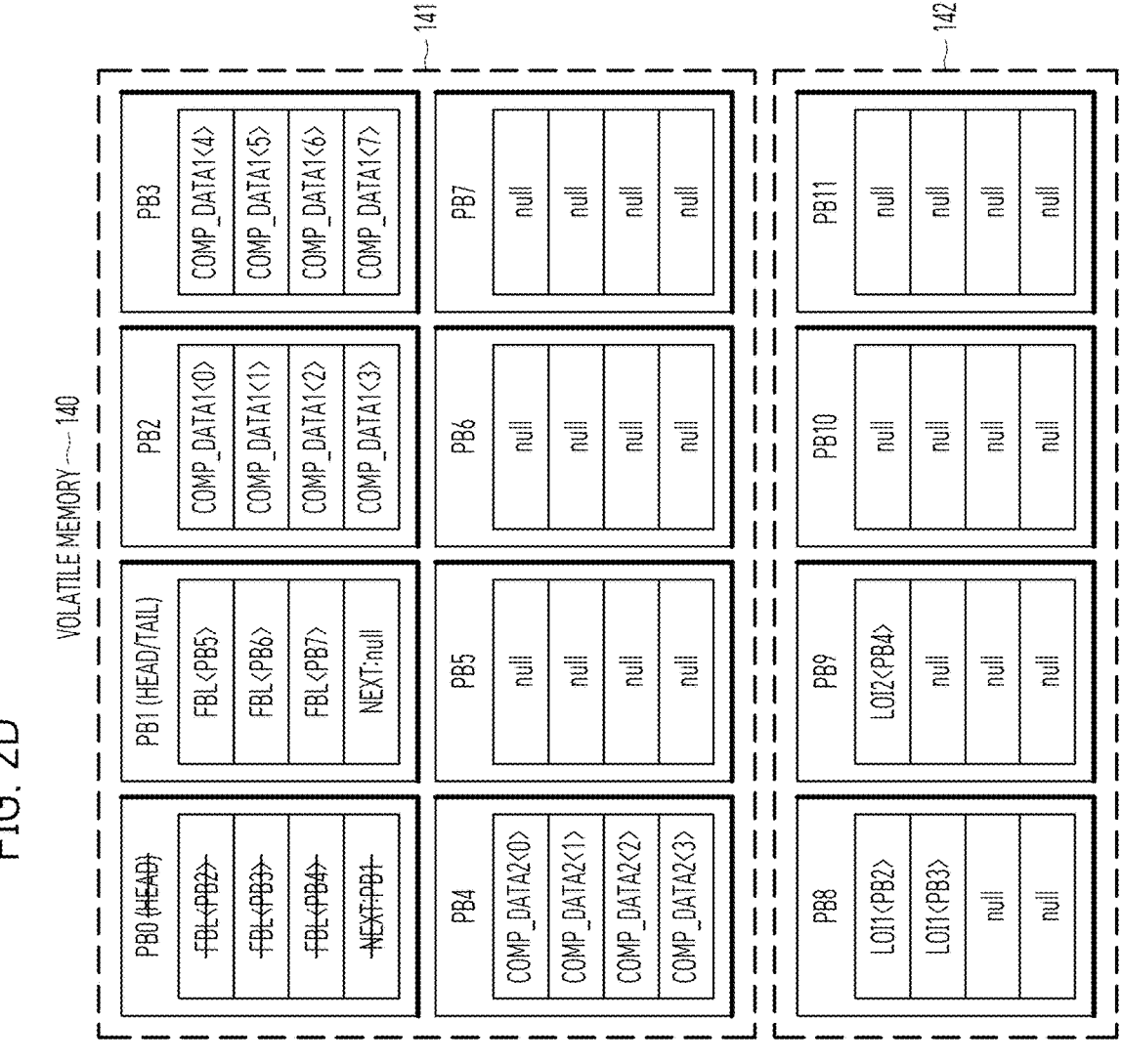
Figure 2E:
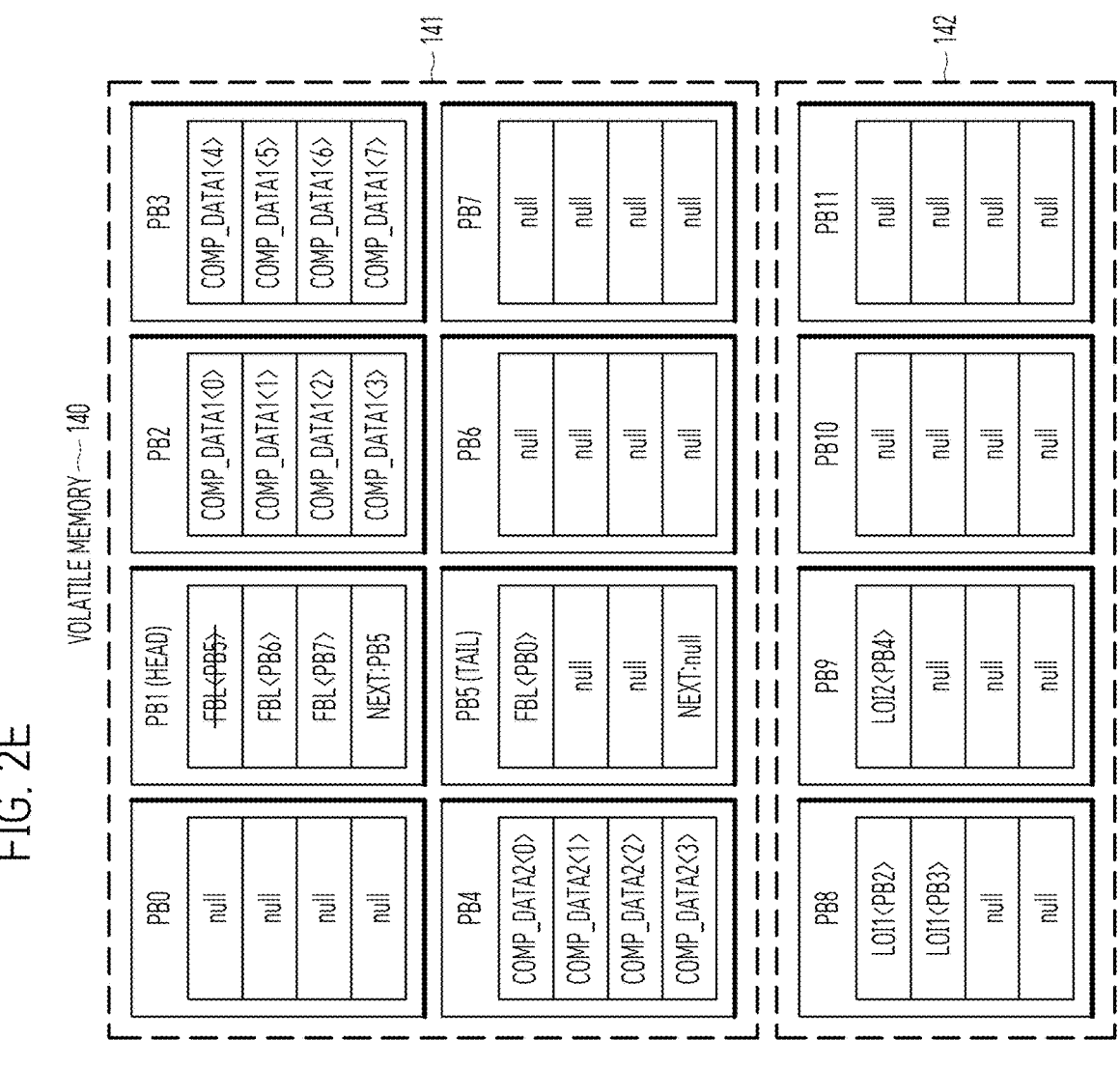

Referring to FIGS. 2D and 2E, it can be seen how the area PB0 storing the invalidated information FBL<PB2:4> among the free area information is managed in the two physical areas PB<0:1> set as management areas after the first and second compressed data COMP_DATA1<0:7> and COMP_DATA2<0:3> are stored in the first and second storage areas PB<2:4> of the volatile memory 140 in FIGS. 2B and 2C.

First, referring to FIG. 2D, after the first and second compressed data COMP_DATA1<0:7> and COMP_DATA2<0:3> are stored in the first and second storage areas PB<2:4> of the volatile memory 140, the information FBL<PB2:4> corresponding to the first and second storage areas may be invalidated in the management area and may not be managed in the free area information. This may mean that all three pieces of information FBL<PB2:4> stored in the first management area PB0 set as the header HEAD of the two physical areas PB<0:1> set as the management areas are invalidated.

In such a case, the control operation circuit 134 may set, as a new header HEAD, the second management area PB1 set in the next information NEXT of the first management area PB0 set as the header HEAD, that is, the physical area PB1 set as the tail TAIL in the drawing. In this way, while setting the second management area PB1, which has already been set as the tail TAIL, as the header HEAD, the second management area PB1 may be set as the header HEAD and the tail TAIL at the same time.

In addition, the control operation circuit 134 may invalidate the next information NEXT of the first management area PB0 while setting the second management area PB1 as the header HEAD and tail TAIL at the same time. That is, the control operation circuit 134 may invalidate all data or information stored in the four storage areas included in the first management area PB0.

Referring to FIG. 2E, after invalidating all data or information stored in the four storage areas included in the first management area PB0, the control operation circuit 134 may switch the first management area PB0 into a free area and put the free area into the free area information.

Specifically, after switching the first management area PB0 into the free area, the control operation circuit 134 may check whether information FBL<PB0> corresponding to the free area may be stored in the management area and put into the free area information, that is, the information FBL<PB0> may be stored in the second management area PB1 set as the header HEAD and tail TAIL at the same time.

As illustrated in the drawing, when there is no remaining storage space in the second management area PB1, the control operation circuit 134 may check that information FBL<PB0> corresponding to a new free area PB0 is not storable in the second management area PB1. Accordingly, the control operation circuit 134 may put one free area PB5 into the management area as a third management area with reference to the free area information stored in the second management area PB1, and manage the second management area PB1 already included and the third management area PB5 in the form of a linked list. That is, the control operation circuit 134 may store the information FBL<PB0> corresponding to the new free area PB0 in the third management area PB5 newly included in the management area, put the information FBL<PB0> into the free area information, set the third management area PB5 in the next information NEXT of the second management area PB1, and then set a 'null' value indicating the absence of a next area in the next information NEXT of the third management area PB5. Through this, the control operation circuit 134 may set the second management area PB1, which has been set as the header HEAD and the tail TAIL at the same time, as only a header HEAD, and set the newly added third management area PB5 as a tail TAIL.

In addition, the control operation circuit 134 may invalidate information FBL<PB5> corresponding to the third management area PB5 newly included in the management area among the free area information stored in the second management area PB1. That is, the control operation circuit 134 may invalidate one piece of information FBL<PB5> among the free area information stored in the second management area PB1, newly switch the second management area PB1 to a free area, store generated information FBL<PB0> in the third management area PB5 newly included in the management area, and put the information FBL<PB0> into the free area information.

Unlike the drawing, when there is a remaining storage space in the second management area PB1, the control operation circuit 134 may store the information FBL<PB0> corresponding to the new free area PB0 in the remaining storage space of the second management area PB1, put the information FBL<PB0> into the free area information. That is, the second management area PB1 may continuously maintain the state set as the header HEAD and the tail TAIL.

Since it is illustrated in the drawing that the management area includes two physical areas PB<0:1>, when the first management area PB0 set as the header HEAD is invalidated, the second management area PB1 may be set as the header HEAD and the tail TAIL at the same time. According to an embodiment, unlike the drawing, when the management area includes three or more physical areas, a physical area set as the header and a physical area set as the tail may be divided into different areas even when the physical area set as the header is invalidated. According to another embodiment, unlike the drawing, in a case where the management area includes only one physical area set as the header HEAD and the tail TAIL at the same time, when the physical area is invalidated, one remaining physical area may be switched into a free area by releasing the management area and not managing the free area information.

Figure 2F:
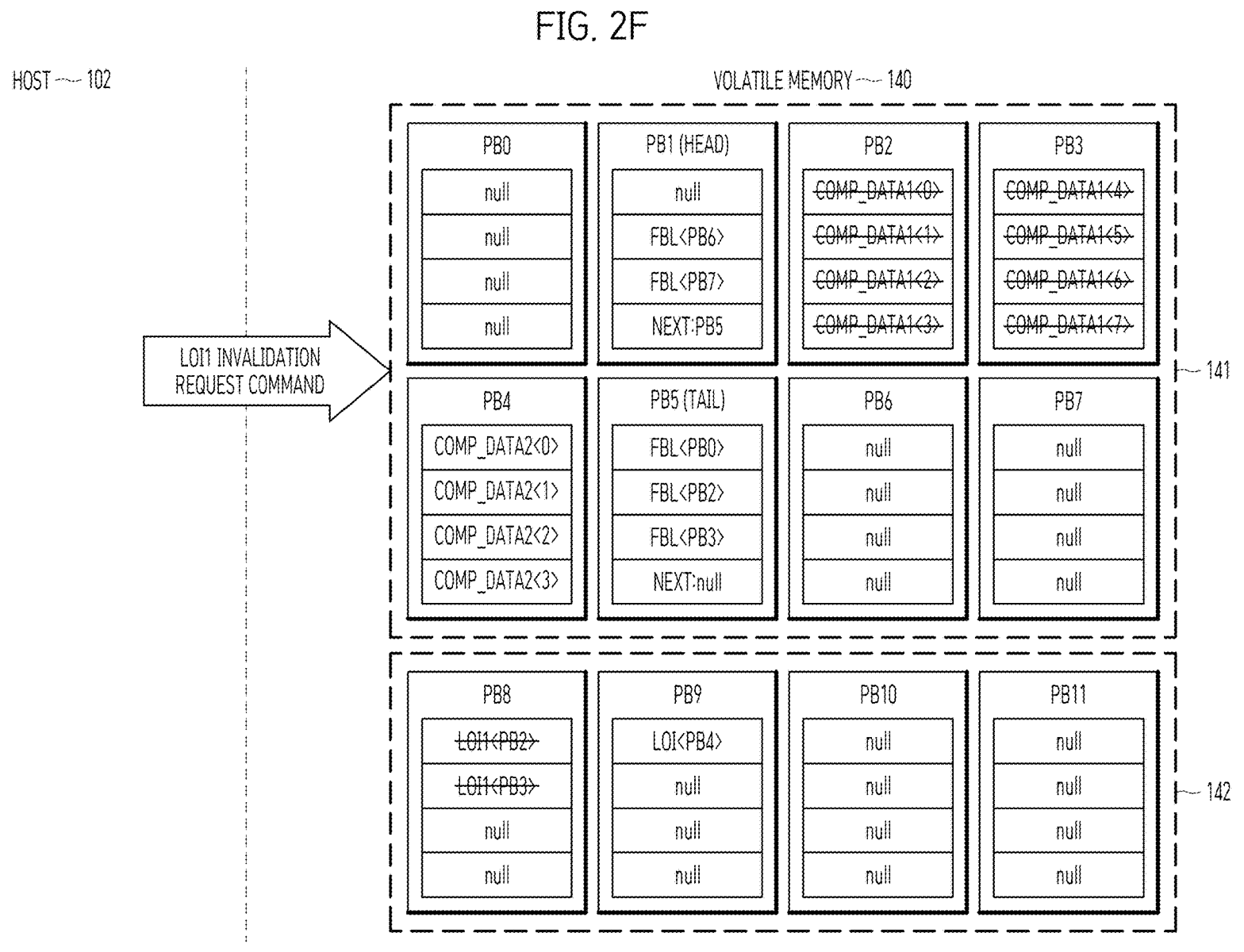

Referring to FIG. 2F, it can be seen how the control operation circuit 134 operates in response to a command requesting invalidation of the first logical information LOI1<PB2:3> after the state described with reference to FIG. 2E.

Specifically, the state described with reference to FIG. 2E may mean a state in which the first compressed data COMP_DATA1<0:7> is stored in the first storage areas PB<2:3> of the volatile memory 140, the first logical information LOI1<PB2:3> is stored in the first selected area PB8, and the management area includes two physical areas PB<1, 5>.

In such a state, in order to invalidate the first compressed data COMP_DATA1<0:7> stored in the volatile memory 140, the host 102 may generate the command requesting the invalidation of the first logical information LOI1<PB2:3>, and transmit the generated command to the control operation circuit 134 of the controller 130. In response to the command requesting the invalidation of the first logical information LOI1<PB2:3>, the control operation circuit 134 may invalidate the first logical information LOI1<PB2:3> stored in the first selected area PB8.

In such a case, since the control operation circuit 134 performs a read operation on the first compressed data COMP_DATA1<0:7> through the first logical information LOI1<PB2:3>, the first logical information LOI1<PB2:3> stored in the first selected area PB8 is invalidated, so that the first compressed data COMP_DATA1<0:7> stored in the two physical areas PB<2:3> set as the first storage areas indicated by the first logical information LOI1<PB2:3> may also be invalidated.

In addition, the control operation circuit 134 may invalidate the first selected area PB8 and the first compressed data COMP_DATA1<0:7> in response to the command requesting the invalidation of the first logical information LOI1<PB2:3>, switch the first storage areas PB<2:3> having stored the first compressed data COMP_DATA1<0:7> into free areas, store the information FBL<PB2:3> corresponding to the first storage areas PB<2:3> in the third management area PB5 set as the management area, and put the information FBL<PB2:3> into the free area information.

Referring to FIG. 2G, it can be seen how the control operation circuit 134 operates in response to a command requesting invalidation of the second logical information LOI2<PB4> after the state described with reference to FIG. 2E.

Specifically, the state described with reference to FIG. 2E may mean a state in which the second compressed data COMP_DATA2<0:3> is stored in the second storage area PB4 of the volatile memory 140, the second logical information LOI2<PB4> is stored in the second storage area PB9, and the management area includes the two physical areas PB<1, 5>.

In such a state, in order to invalidate the second compressed data COMP_DATA2<0:3> stored in the volatile memory 140, the host 102 may generate the command requesting the invalidation of the second logical information LOI2<PB4>, and transmit the generated command to the control operation circuit 134 of the controller 130. In response to the command requesting the invalidation of the second logical information LOI2<PB4>, the control operation circuit 134 may invalidate the second logical information LOI2<PB4> stored in the second storage area PB9.

In such a case, since the control operation circuit 134 performs a read operation on the second compressed data COMP_DATA2<0:3> through the second logical information LOI2<PB4>, the second logical information LOI2<PB4> stored in the second storage area PB9 is invalidated, so that the second compressed data COMP_DATA2<0:3> stored in the one physical areas PB4 set as the second storage area indicated by the second logical information LOI2<PB4> may also be invalidated.

In addition, the control operation circuit 134 may invalidate the second selected area PB9 and the second compressed data COMP_DATA2<0:3> in response to the command requesting the invalidation of the second logical information LOI2<PB4>, switch the second storage area PB4 having stored the second compressed data COMP_DATA2<0:3> into a free area, store the information FBL<PB4> corresponding to the second storage areas PB4 in the third management area PB5 set as the management area, and put the information FBL<PB4> into the free area information.

FIGS. 3A to 31 are diagrams for describing an operation in which the storage device in accordance with the second embodiment of the present disclosure stores compressed data in an internal volatile memory and manages the stored compressed data.

Referring to FIGS. 3A to 31, an operation in which the control operation circuit 134 stores compressed data in the volatile memory 140 and manages the compressed data while using the free area queue 136 may be described. In such a case, the control operation circuit 134 may be used in a state in which the free area queue 136 is stored in an allocated area of the internal memory 137. In particular, the internal memory 137 included in the control operation circuit 134 may be a memory with a relatively higher operating speed than the volatile memory 140. For example, when the volatile memory 140 is DRAM, the internal memory 137 included in the control operation circuit 134 may be SRAM.

It can be seen that FIGS. 3A to 31 illustrate only the volatile memory 140 and the host 102 included in the storage device 110 among the components of the data processing system illustrated in FIGS. 1A to 1C. That is, it can be seen that the operation of the storage device 110 to be described below with reference to FIGS. 3A to 31 is based on the configuration of the storage device 110 described with reference to FIGS. 1A to 1C.

In addition, in FIGS. 3A to 31, the volatile memory 140 includes 12 physical areas PB<0:11>, and 8 PB<0:7> of the 12 physical areas PB<0:11> are divided into the first physical areas 141 and the remaining four PB<8:11> are divided into the second physical areas 142. In addition, each of the 12 physical areas PB<0:11> included in the volatile memory 140 includes 4 storage spaces. This is merely an example for convenience of description, and actually, a different number of physical areas and storage spaces may be set.

Figure 3A:
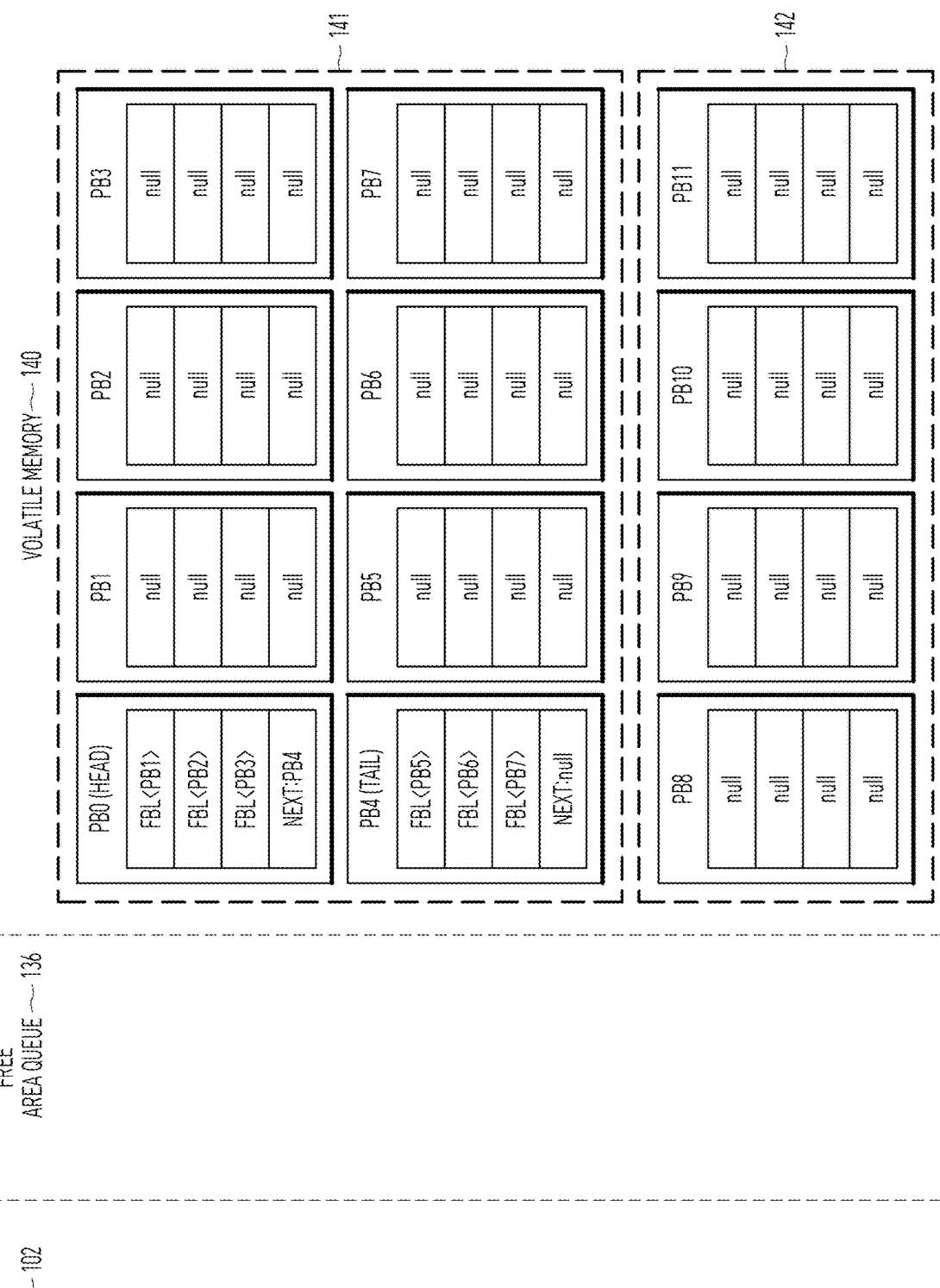

Referring to FIG. 3A, an initialization state of the storage device 110 can be seen. In such a case, the initialization state of the storage device 110 may mean a state in which no compressed data is stored in the volatile memory 140.

Specifically, in the initialization state, the control operation circuit 134 included in the controller 130 divides the plurality of physical areas PB<0:11> included in the volatile memory 140 into the first physical areas 141 and the second physical areas 142.

Subsequently, the control operation circuit 134 may check the current number of free areas included in the first physical areas 141, and set some of the current number of free areas as management areas according to the check result.

In the drawing, it can be seen that among the eight physical areas PB<0:7> included in the first physical areas 141, two physical areas PB<0, 4> are set as management areas and the remaining six physical areas PB<1:3, 5:7> are free areas.

However, at a time prior to the state illustrated in the drawing, that is, before the two physical areas PB<0, 4> are set as management areas, all the eight physical areas PB<0:7> included in the first physical areas 141 may have been free areas. In such a state, the control operation circuit 134 may set the two physical areas PB<0, 4> as management areas, and generate free area information indicating that the remaining six physical areas PB<1:3, 5:7> are free areas, and store the generated free area information in the two physical areas PB<0, 4> set as the management areas.

In addition, the control operation circuit 134 may manage the two physical areas PB<0, 4> set as the management areas in the form of a linked list. That is, of the two physical areas PB<0, 4> set as the management areas, the control operation circuit 134 may set a first management area PB0 as a header HEAD, set a second management area PB4 as a tail TAIL, set the second management area PB4 in next information NEXT of the first management area PB0 being the header HEAD, and set a 'null' value indicating the absence of a next area in next information NEXT of the second management area PB4 being the tail TAIL.

In the drawing, since the two physical areas PB<0, 4> set as the management areas are managed in the form of a linked list, it can be seen that free area information indicating three free areas is stored in three of four storage spaces included in each of the two physical areas PB<0, 4> and the remaining one storage space is used as a space for storing next information NEXT. Accordingly, it can be seen that six pieces of free area information is divided into three pieces of information FBL<PB1:3> and three pieces of information FBL<PB5:7> and the three pieces of information FBL<PB1:3> and the three pieces of information FBL<PB5:7> are stored in the two physical areas PB<0, 4> set as the management areas, respectively.

Since no compressed data is stored in the first physical areas 141, the control operation circuit 134 may not store any logical data in the second physical areas 142.

Figure 3B:
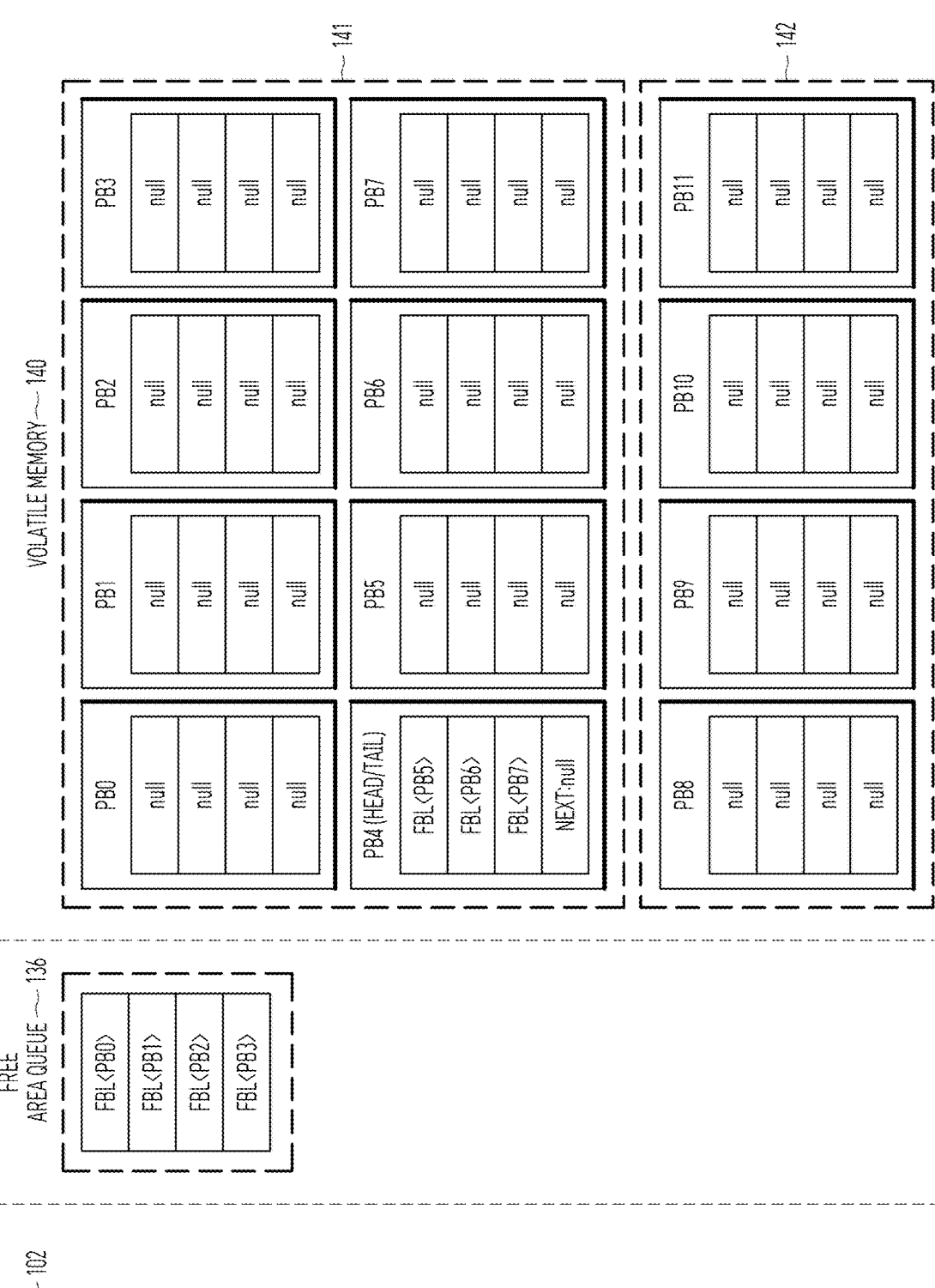

Referring to FIG. 3B, it can be seen that some of the free area information is moved to the free area queue 136 allocated to the internal memory 137 for management after the free area information is stored in the management area of the volatile memory 140 in FIG. 3A.

Specifically, the control operation circuit 134 may select partial information of the free area information managed in the management area of the volatile memory 140, and move the selected information to the free area queue 136 allocated to the internal memory 137.

In addition, the control operation circuit 134 may move the partial information of the free area information managed in the management area to the free area queue 136 allocated to the internal memory 137, switch a physical area having stored the partial information of the free area information among the first physical areas 141 set as the management area into a free area, and move information on the switched free area to the free area queue 136 for management.

According to the embodiment, as illustrated in the drawing, the control operation circuit 134 may move partial information FBL<PB1:3> of the free area information, which is stored in the first management area PB0 set as the header HEAD out of the two physical areas PB<0, 4> set as the management areas, to the free area queue 136 for management. In such a case, the control operation circuit 134 may set, as a new header HEAD, the second management area PB4 set in the next information NEXT of the first management area PB0 set as the header HEAD in the management area, that is, the physical area PB4 set as the tail TAIL in the drawing. In this way, while setting the second management area PB4, which has already been set as the tail TAIL, as the header HEAD, the second management area PB4 may be set as the header HEAD and the tail TAIL at the same time. In addition, the control operation circuit 134 may move the partial information FBL<PB1:3> of the free area information stored in the first management area PB0 to the free area queue 136, switch the first management area PB0 into a free area, move information FBL<PB0> on the area PB0 switched into the free area to the free area queue 136, and then manage the information FBL<PB0> together with the partial information FBL<PB1:3>.

Referring to FIG. 3C, it can be seen how the storage device 110 manages first write data NM_DATA1 generated in the host 102 after the state described with reference to FIG. 3B.

Specifically, the compression operation circuit 132 included in the controller 130 may generate first compressed data COMP_DATA1<0:7> by compressing the first write data NM_DATA1 transmitted from the host 102 at a first ratio.

Subsequently, the control operation circuit 134 included in the controller 130 may refer to the free area queue 136 and the free area information managed in the management area in order to store the first compressed data COMP_DATA1<0:7> in the volatile memory 140, and set two areas PB<0:1> of seventh free areas PB<0:3, 5:7> included in the first physical areas 141 as first storage areas. That is, the control operation circuit 134 may check that the first compressed data COMP_DATA1<0:7> includes 8 partial data (i.e., check that it exceeds 4 and is equal to or less than 8), and then set two areas PB<0:1> among the current free areas PB<0:3, 5:7> of the first physical areas 141 as the first storage areas.

In addition, the control operation circuit 134 may store the first compressed data COMP_DATA1<0:7> in the first storage areas PB<0:1>. That is, the control operation circuit 134 may divide eight partial data COMP_DATA1<0>, COMP_DATA1<1>, COMP_DATA1<2>, COMP_DATA1<3>, COMP_DATA1<4>, COMP_DATA1<5>, COMP_DATA1<6>, and COMP_DATA1<7> included in the first compressed data COMP_DATA1<0:7> into four partial data COMP_DATA1<0:3> and four partial data COMP_DATA1<4:7>, and store the four partial data COMP_DATA1<0:3> and the four partial data COMP_DATA1<4:7> in the two areas PB<0:1> set as the first storage areas, respectively.

In addition, the control operation circuit 134 may store the first compressed data COMP_DATA1<0:7> in the first storage area, and then invalidate, from the free area queue 136 and the management area, information FBL<PB0:1> corresponding to the first storage areas among the free area information. That is, the control operation circuit 134 may invalidate the information FBL<PB0:1> corresponding to the first storage areas among the free area information managed in the free area queue 136 and the management area. According to an embodiment, as illustrated in the drawing, when the information FBL<PB0:1> corresponding to the first storage areas is stored in the free area queue 136, the control operation circuit 134 may invalidate the information FBL<PB0:1> by deleting the information FBL<PB0:1> from the free area queue 136. According to another embodiment, unlike the drawing, when the information corresponding to the first storage areas is stored in a storage space included in the management area of the volatile memory 140, the operation of invalidating information stored in the storage space may be an operation of overwriting the value of the storage space with a specific value, for example, a 'null' value, or an operation of indicating that the value of the storage space is invalidated so that other data or information may be overwritten later.

In addition, the control operation circuit 134 may generate first logical information LOI1<PB0:1> indicating the two areas PB<0:1> set as the first storage areas, and store the first logical information LOI1<PB0:1> in the first selected area PB8 of the second physical areas 142. That is, the control operation circuit 134 may store two partial information LOI1<PB0> and LOI1<PB1> included in the first logical information LOI1<PB0:1> in two of four storage spaces included in the first selected area PB8, respectively.

Figure 3D:
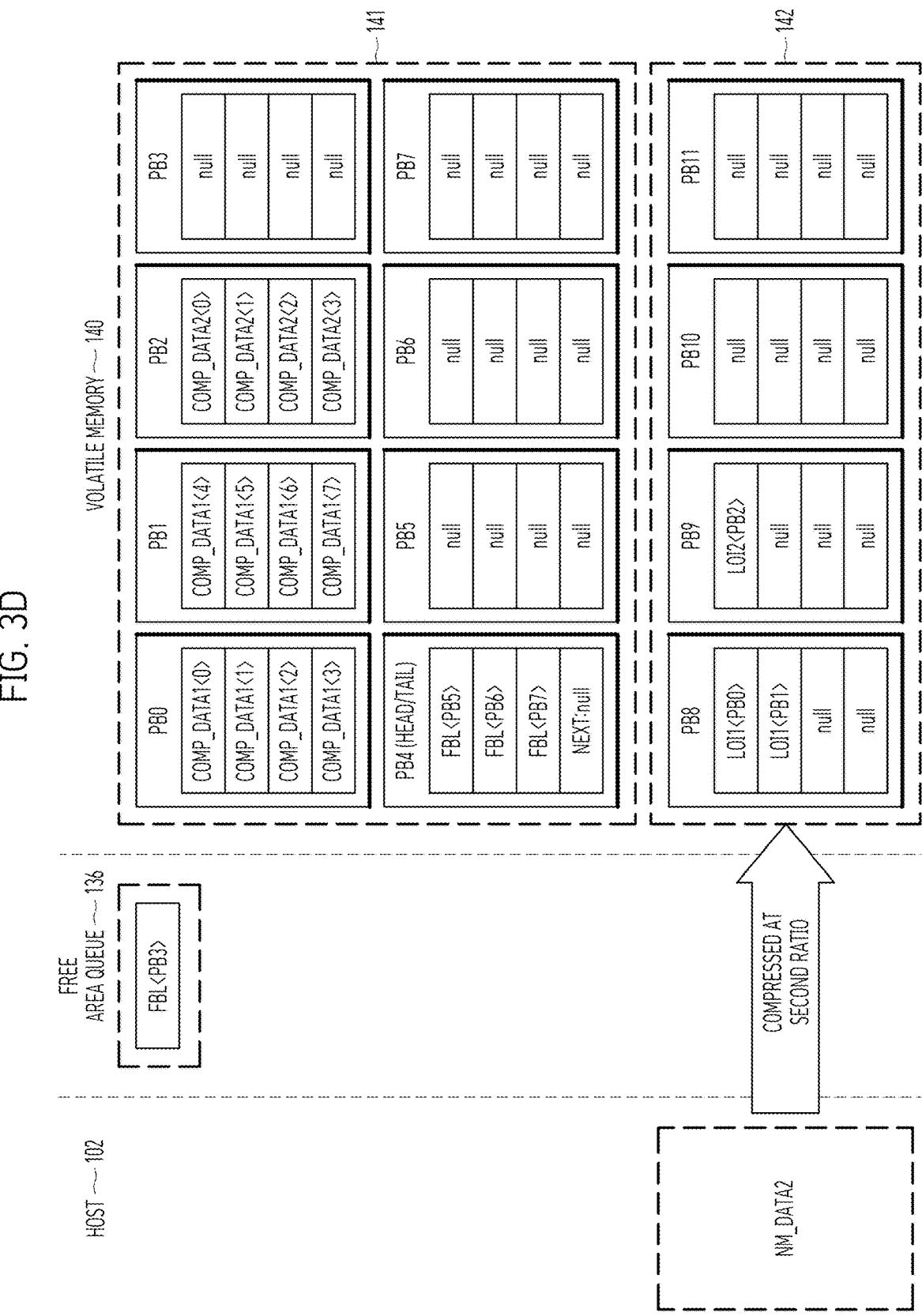

Referring to FIG. 3D, it can be seen how second write data NM_DATA2 generated in the host 102 is managed in the storage device 110 after the first write data NM_DATA1 generated in the host 102 in FIG. 3C is stored in the first storage areas PB<0:1> of the volatile memory 140 as the first compressed data COMP_DATA1<0:7> compressed at the first ratio.

Specifically, the compression operation circuit 132 included in the controller 130 may generate second compressed data COMP_DATA2<0:3> by compressing the second write data NM_DATA2 transmitted from the host 102 at a second ratio. In such a case, as can be seen from the fact that the first compressed data COMP_DATA1<0:7> obtained by compressing the first write data NM_DATA1 at the first ratio includes 8 partial data and the second compressed data COMP_DATA2<0:3> obtained by compressing the second write data NM_DATA2 at the second ratio includes four partial data, it can be seen that the compression rate of the second ratio is higher than that of the first ratio.

Subsequently, in order to store the second compressed data COMP_DATA2<0:3> in the volatile memory 140, the control operation circuit 134 included in the controller 130 may refer to the free area information managed in the free area queue 136 and the management area, and set one area PB2 of the five free areas PB<2:3, 5:7> included in the first physical areas 141 as a second storage area. That is, the control operation circuit 134 may check that the second compressed data COMP_DATA2<0:3> includes four partial data (i.e., checks that it is 4 or less), and then set one area PB2 of the current free areas PB<2:3, 5:7> of the first physical areas 141 as the second storage area.

In addition, the control operation circuit 134 may store the second compressed data COMP_DATA2<0:3> in the second storage area PB2. That is, the control operation circuit 134 may store four partial data COMP_DATA2<0>, COMP_DATA2<1>, COMP_DATA2<2>, and COMP_DATA2<3> included in the second compressed data COMP_DATA2<0:3> in the one area PB2 set as the second storage area.

In addition, the control operation circuit 134 may store the second compressed data COMP_DATA2<0:3> in the second storage area, and then invalidate, from the free area queue 136 and the management area, information FBL<PB2> corresponding to the second storage area among the free area information. That is, the control operation circuit 134 may invalidate the information FBL<PB2> corresponding to the second storage area among the free area information managed in the free area queue 136 and the management area.

In such a case, the information FBL<PB0:1> corresponding to the first storage areas among the free area information managed in the free area queue 136 and the management area has already been invalidated in FIG. 3C. Accordingly, in FIG. 3D, all information FBL<PB0:2> corresponding to the first and second storage areas among the free area information managed in the free area queue 136 and the management area may be invalidated. According to an embodiment, as illustrated in the drawing, when the information FBL<PB0:2> corresponding to the first and second storage areas is stored in the free area queue 136, the control operation circuit 134 may invalidate the information FBL<PB0:2> by deleting the information FBL<PB0:2> from the free area queue 136.

In addition, the control operation circuit 134 may generate second logical information LOI2<PB2> indicating one area PB2 set as the second storage area, and store the second logical information LOI2<PB2> in the second selected area PB9 of the second physical areas 142. That is, the second logical information LOI2<PB2> indicating the one area PB2 set as the second storage area may be stored in one of four storage spaces included in the second selected area PB9.

In such a case, even though only the first logical information LOI1<PB0:1> is stored in the first selected area PB8 described with reference to FIG. 3C and two storage areas are empty, the reason for storing the second logical information LOI2<PB2> in the second selected area PB9 in FIG. 3D is because the first compressed data COMP_DATA1<0: 7> stored in the first storage areas PB<0:1> indicated by the first logical information LOI1<PB0:1> is data obtained by compressing the first write data NM_DATA1 at the first ratio and the second compressed data COMP_DATA2<0:3> stored in the second storage area PB2 indicated by the second logical information LOI2<PB2> is data obtained by compressing the second write data NM_DATA2 at the second ratio.

That is, the control operation circuit 134 may distinguish areas for storing logical information indicating compressed data, according to the compression ratio of the write data used to generate the compressed data. That is, unlike in the drawing, when the second compressed data COMP_DATA2<0:3> is data obtained by compressing the second write data NM_DATA2 at the first ratio, the second logical information LOI2<PB2> indicating the second compressed data COMP_DATA2<0:3> may be stored in the first selected area PB8.

Figure 3E:
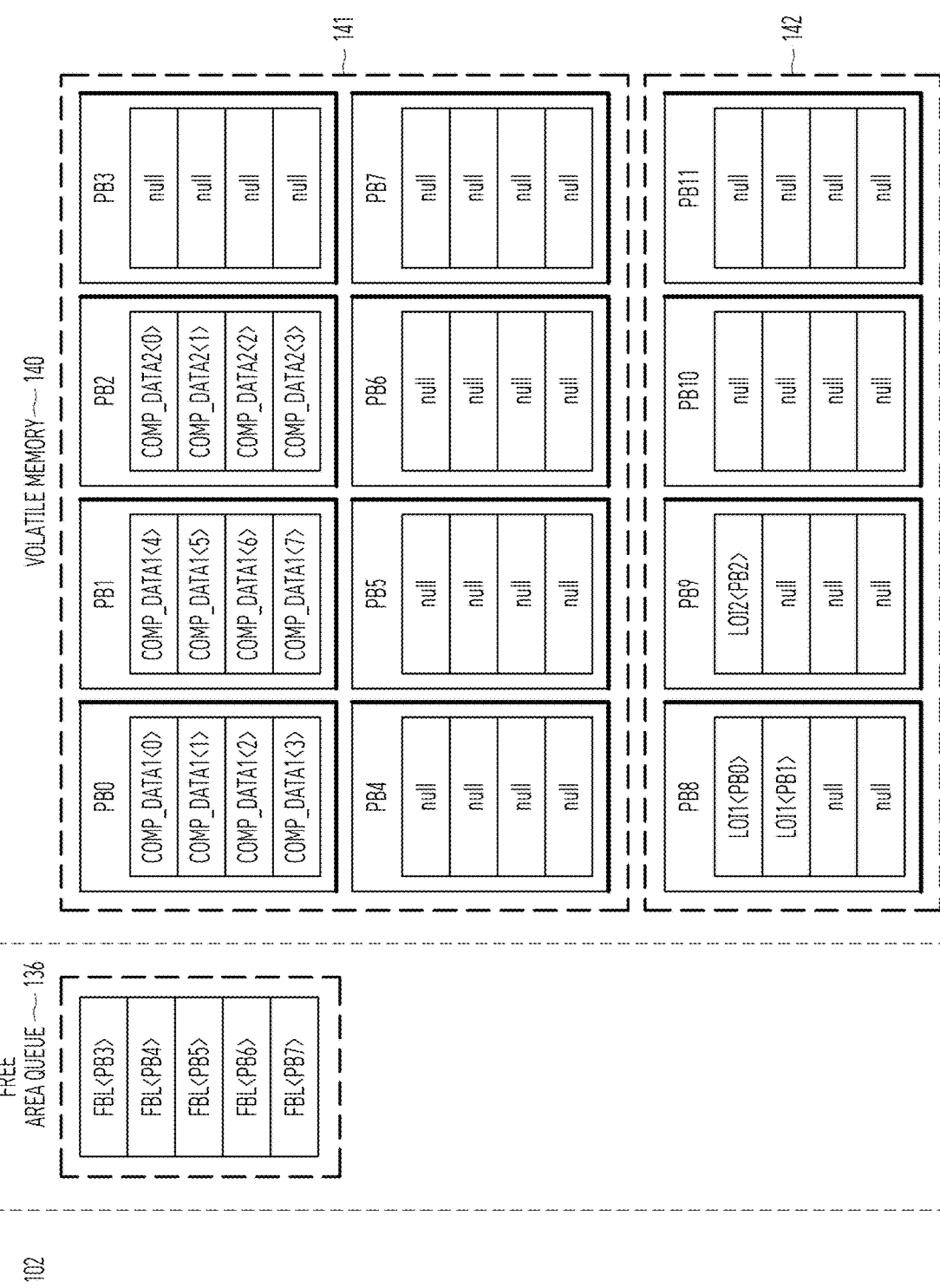

Referring to FIG. 3E, it can be seen that some of the free area information stored in the management area of the volatile memory 140 is moved to the free area queue 136 allocated to the internal memory 137 for management after the state described with reference to FIG. 3D.

Specifically, the control operation circuit 134 may select partial information of the free area information managed in the management area of the volatile memory 140 and move the selected information to the free area queue 136 allocated to the internal memory 137.

In addition, the control operation circuit 134 may move the partial information of the free area information managed in the management area to the free area queue 136 allocated to the internal memory 137, switch a physical area having stored the partial information of the free area information among the first physical areas 141 set as the management area into a free area, and move information on the switched free area to the free area queue 136 for management.

According to an embodiment, as illustrated in the drawing, the control operation circuit 134 may move partial information FBL<PB4:7> of the free area information, which is stored in the second management area PB4 set as the management area, to the free area queue 136 for management. In such a case, the control operation circuit 134 may check that 'null' is set in the next information NEXT of the second management area PB4 simultaneously set as the header HEAD and tail TAIL in the management area, and release the management area from the volatile memory 140.

In addition, the control operation circuit 134 may move the partial information FBL<PB4:7> of the free area information stored in the second management area PB4 to the free area queue 136, switch the second management area PB4 into a free area, move information FBL<PB4> on the area PB4 switched into the free area to the free area queue 136, and then manage the information FBL<PB4> together with the partial information FBL<PB4:7>.

Accordingly, the control operation circuit 134 may manage the information FBL<PB4:7> moved to the free area queue 136 in FIG. 3E as free area information together with the information FBL<PB3> remaining in the free area queue 136 before FIG. 3E.

Figure 3F:
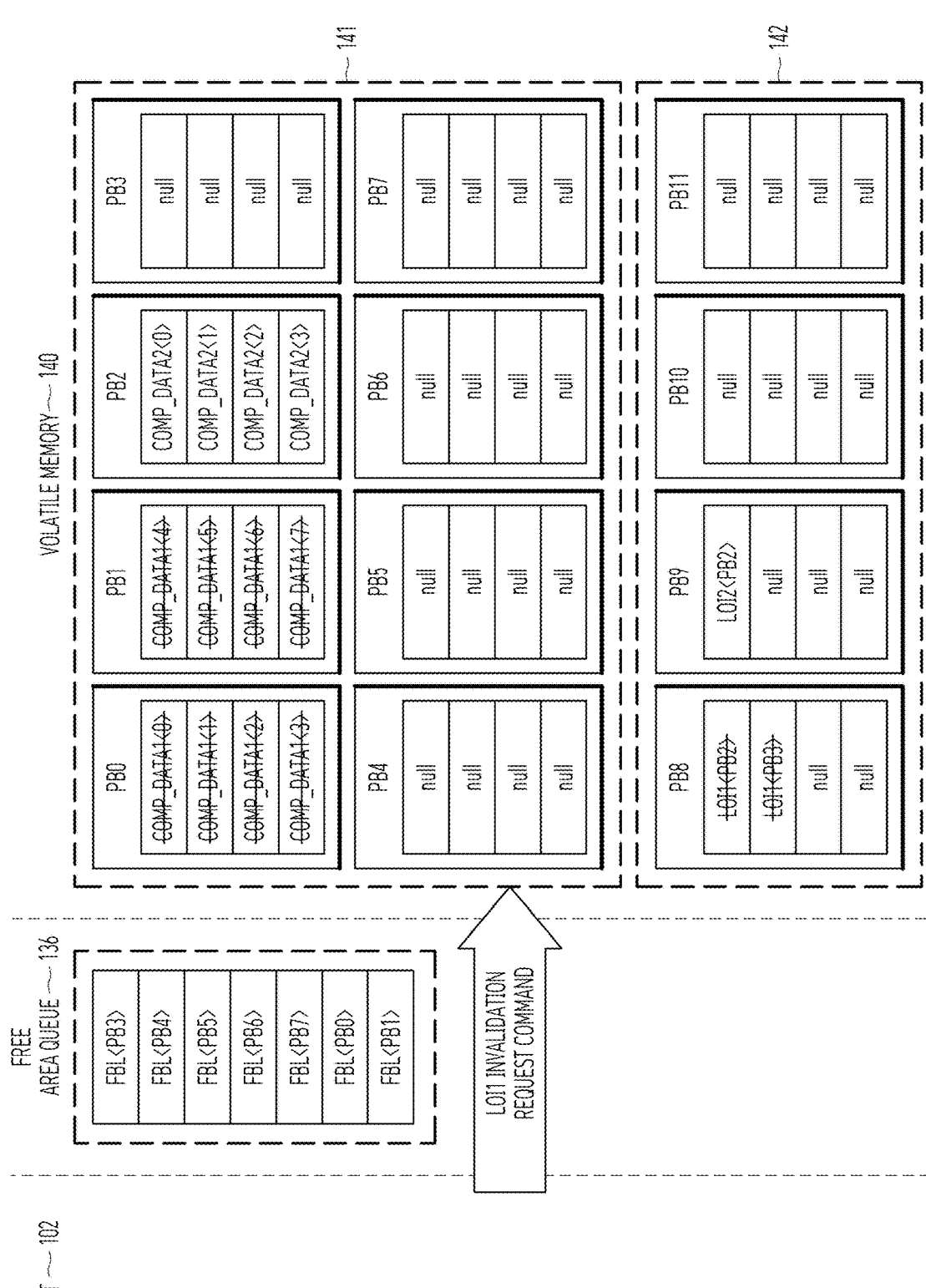

Referring to FIG. 3F, it can be seen how the control operation circuit 134 operates in response to a command requesting invalidation of the first logical information LOI1<PB0:1> after the state described with reference to FIG. 3E.

Specifically, the state described with reference to FIG. 3E may mean a state in which the first compressed data COMP_DATA1<0:7> is stored in the first storage area PB<0:1> of the volatile memory 140, the first logical information LOI1<PB0:1> is stored in the first selected area PB8, the management area of the volatile memory 140 is released, and the free area information is stored in the free area queue 136.

In such a state, in order to invalidate the first compressed data COMP_DATA1<0:7> stored in the volatile memory 140, the host 102 may generate the command requesting the invalidation of the first logical information LOI1<PB0:1>, and transmit the generated command to the control operation circuit 134 of the controller 130. In response to the command requesting the invalidation of the first logical information LOI1<PB0:1>, the control operation circuit 134 may invalidate the first logical information LOI1<PB0:1> stored in the first selected area PB8.

In such a case, since the control operation circuit 134 performs a read operation on the first compressed data COMP_DATA1<0:7> through the first logical information LOI1<PB0:1>, the first logical information LOI1<PB0:1> stored in the first selected area PB8 is invalidated, so that the first compressed data COMP_DATA1<0:7> stored in the two physical areas PB<0:1> set as the first storage areas indicated by the first logical information LOI1<PB0:1> may also be invalidated.

In addition, the control operation circuit 134 may invalidate the first selected area PB8 and the first compressed data COMP_DATA1<0:7> in response to the command requesting the invalidation of the first logical information LOI1<PB0:1>, switch the first storage areas PB<0:1> having stored the first compressed data COMP_DATA1<0:7> into free areas, store the information FBL<PB0:1> corresponding to the first storage areas PB<0:1> in the free area queue 136, and put the information FBL<PB0:1> into the free area information.

Accordingly, in the free area queue 136, the information FBL<PB0:1> moved to the free area queue 136 in FIG. 3F may be managed as free area information, together with the information FBL<PB3:7> remaining in the free area queue 136 before FIG. 3F. In such a case, the information FBL<PB3:7> remaining in the free area queue 136 before FIG. 3F may be aligned to be referenced with a higher priority than the information FBL<PB0:1> moved to the free area queue 136 after FIG. 3F.

Referring to FIG. 3G, it can be seen that some of the free area information stored in the free area queue 136 is moved to the management area of the volatile memory 140 for management.

Specifically, the internal memory 137 included in the control operation circuit 134 may have a relatively small storage space instead of having a higher operating speed than the volatile memory 140.

Accordingly, when the size of the free area queue 136 allocated to the internal memory 137 exceeds an appropriate size, the free area information stored in the free area queue 136 may be moved to the management area of the volatile memory 140 for management.

More specifically, all free area information may be stored in the free area queue 136 after FIG. 3F. In addition, in the volatile memory 140, the management area may be released.

In such a state, the control operation circuit 134 may set some of the first physical areas 141 of the volatile memory 140 as management areas, and then move some of the free area information stored in the free area queue 136 for management.

According to an embodiment, free area information on a total of seven free areas PB<3:7, 0:1> may be stored in the free area queue 136 after FIG. 3F. The control operation circuit 134 may refer to the free area information stored in the free area queue 136, and set, as a management area, the physical area PB3 of the volatile memory 140 corresponding to one piece of information FBL<PB3> among the seven pieces of information FBL<PB3:7, 0:1>. In such a case, the one physical area PB3 set as the management area may be set as the header HEAD and the tail TAIL, and 'null' may be set in the next information NEXT.

Subsequently, the control operation circuit 134 may refer to the free area information stored in the free area queue 136, move three pieces of information FBL<PB4:6> of six pieces of information FBL<4:7, 0:1> to the one physical area PB3 set as the management area and store the three pieces of information FBL<PB4:6>, and manage only the remaining three pieces of information FBL<PB7, 0:1> in the free area queue 136.

Figure 3H:
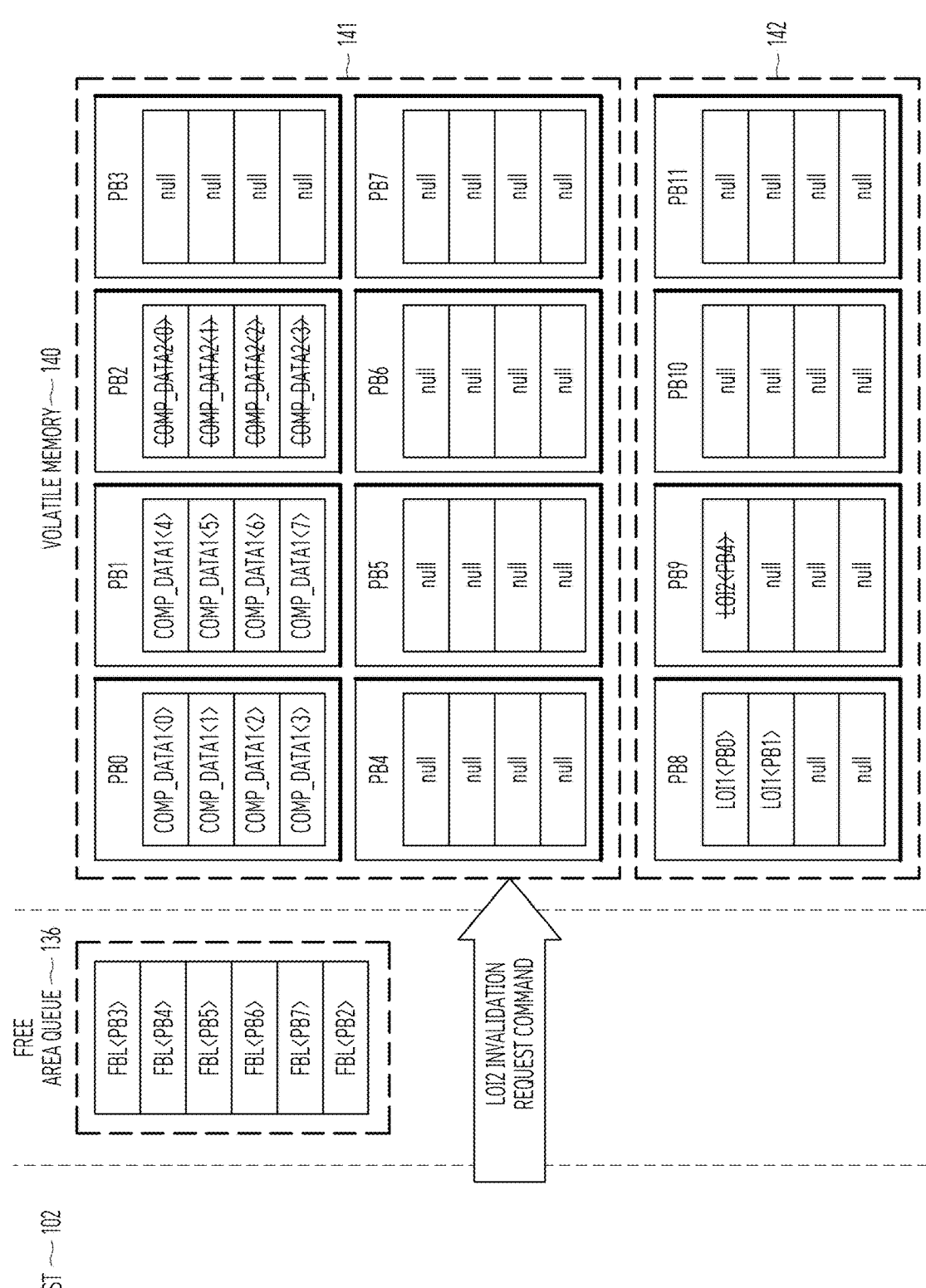

Referring to FIG. 3H, it can be seen how the control operation circuit 134 operates in response to a command requesting invalidation of the second logical information LOI2<PB2> after the state described with reference to FIG. 3E.

Specifically, the state described with reference to FIG. 3E may mean a state in which the second compressed data COMP_DATA2<0:3> is stored in the second storage area PB<2> of the volatile memory 140, the second logical information LOI2<PB2> is stored in the second selected area PB9, the management area of the volatile memory 140 is released, and the free area information is stored in the free area queue 136.

In such a state, in order to invalidate the second compressed data COMP_DATA2<0:3> stored in the volatile memory 140, the host 102 may generate the command requesting the invalidation of the second logical information LOI2<PB2>, and transmit the generated command to the control operation circuit 134 of the controller 130. In response to the command requesting the invalidation of the second logical information LOI2<PB2>, the control operation circuit 134 may invalidate the second logical information LOI2<PB2> stored in the second selected area PB9.

In such a case, since the control operation circuit 134 performs a read operation on the second compressed data COMP_DATA2<0:3> through the second logical information LOI2<PB2>, the second logical information LOI2<PB2> stored in the second selected area PB9 is invalidated, so that the second compressed data COMP_DATA2<0:3> stored in the one physical area PB<2> set as the second storage area indicated by the second logical information LOI2<PB2> may also be invalidated.

In addition, the control operation circuit 134 may invalidate the second selected area PB9 and the second compressed data COMP_DATA2<0:3> in response to the command requesting the invalidation of the second logical information LOI2<PB2>, switch the second storage area PB<2> having stored the second compressed data COMP_DATA2<0:3> into a free area, store the information FBL<PB2> corresponding to the second storage area PB<2> in the free area queue 136, and put the information FBL<PB2> into the free area information.

Accordingly, in the free area queue 136, the information FBL<PB2> moved to the free area queue 136 in FIG. 3H may be managed as free area information, together with the information FBL<PB3:7> remaining in the free area queue 136 before FIG. 3H. In such a case, the information FBL<PB3:7> remaining in the free area queue 136 before FIG. 3H may be aligned to be referenced with a higher priority than the information FBL<PB2> moved to the free area queue 136 after FIG. 3H.

Referring to FIG. 3I, it can be seen that some of the free area information stored in the free area queue 136 is moved to the management area of the volatile memory 140 for management.

Specifically, the internal memory 137 included in the control operation circuit 134 may have a relatively small storage space instead of having a higher operating speed than the volatile memory 140.

Accordingly, when the size of the free area queue 136 allocated to the internal memory 137 exceeds an appropriate size, the free area information stored in the free area queue 136 may be moved to the management area of the volatile memory 140 for management.

More specifically, all free area information may be stored in the free area queue 136 after FIG. 3H. In addition, in the volatile memory 140, the management area may be released.

In such a state, the control operation circuit 134 may set some of the first physical areas 141 of the volatile memory 140 as management areas, and then move some of the free area information stored in the free area queue 136 for management.

According to an embodiment, free area information on a total of six free areas PB<3:7, 2> may be stored in the free area queue 136 after FIG. 3H. The control operation circuit 134 may refer to the free area information stored in the free area queue 136, and set, as a management area, the physical area PB3 of the volatile memory 140 corresponding to one piece of information FBL<PB3> among the six free areas PB<3:7, 2>. In such a case, the one physical area PB3 set as the management area may be set as the header HEAD and the tail TAIL, and 'null' may be set in the next information NEXT.

Subsequently, the control operation circuit 134 may refer to the free area information stored in the free area queue 136, move three pieces of information FBL<PB4:6> of five pieces of information FBL<4:7, 2> to the one physical area PB3 set as the management area and store the three pieces of information FBL<PB4:6>, and manage only the remaining two pieces of information FBL<PB7, 2> in the free area queue 136.

The embodiments of the present disclosure described above are not limited by the aforementioned embodiments and the accompanying drawings, and it will be apparent to those skilled in the art to which the present disclosure pertains that various replacements, modifications, and changes can be made without departing from the technical spirit of the present disclosure. Furthermore, the embodiments may be combined to form additional embodiments.

What is claimed is:

1. A storage device comprising:
a volatile memory comprising a plurality of physical areas;
a compression operation circuit configured to
compress first write data at a first rate to generate first compressed data, and
compress second write data at a second rate to generate second compressed data; and
a control operation circuit configured to
divide the plurality of physical areas included in the volatile memory into first physical areas and second physical areas, store the first compressed data in the first physical areas, store first logical information indicating an area storing the first compressed data, in a first selected area of the second physical areas, store the second compressed data in the first physical areas, and store second logical information indicating an area storing the second compressed data, in a second selected area of the second physical areas, search for the first logical information in the first selected area, search for the second logical information in the second selected area.

2. The storage device of claim 1, wherein the control operation circuit is configured to:

set some of a current number of free areas as management areas to store free area information on the free areas that are available for storing data, among the first physical areas; and manage the management areas in a form of a linked list.

3. The storage device of claim 2, wherein the control operation circuit is configured to:

select a first storage area from the free areas with reference to the free area information;

store the first compressed data in the selected first storage area;

generate the first logical information indicating the first storage area;

store the first logical information in the first selected area; and invalidate, from the management area, information corresponding to the first storage area, among the free area information.

4. The storage device of claim 3, wherein the control operation circuit is configured to:

invalidate each of the first logical information and the first compressed data in response to a command requesting invalidation of the first logical information;

switch the first storage area into the free area; and put the free area into the free area information.

5. The storage device of claim 3, wherein the control operation circuit is configured to:

select a second storage area from the free areas with reference to the free area information;

store the second compressed data in the selected second storage area;

generate the second logical information indicating the second storage area;

store the second logical information in the second selected area; and invalidate, from the management area, information corresponding to the second storage area, among the free area information.

6. The storage device of claim 5, wherein the control operation circuit is configured to:

invalidate each of the second logical information and the second compressed data in response to a command requesting invalidation of the second logical information;

switch the second storage area into the free area; and put the free area into the free area information.

7. The storage device of claim 5, wherein the control operation circuit is configured to:

check the current number of the free areas among the first physical areas; and vary the number of areas to be set as the management areas, among the current number of the free areas, according to the checked current number of free areas.

8. The storage device of claim 7, wherein, when all information stored in a first management area set as a header in a form of a linked list, among the management areas, is invalidated, the control operation circuit is configured to:

set, as a new header, a second management area set as a next in the first management area;

switch the first management area into the free area; and put the free area into the free area information.

9. The storage device of claim 8, wherein the control operation circuit comprises an internal memory allocated with a space for storing a free area queue and having a relatively higher speed than the volatile memory, and wherein the control operation circuit is configured to move partial information of the free area information to the free area queue to manage the moved information.

10. The storage device of claim 9, wherein the control operation circuit is configured to:

move the partial information to the free area queue;

switch an area storing the partial information, among the first physical areas set as the management areas, into the free area;

move information on the switched free area to the free area queue; and manage the moved information together with the partial information.

11. The storage device of claim 1, wherein the control operation circuit is configured to:

vary a ratio of the first physical areas and the second physical areas among the plurality of physical areas.

12. An operating method of a storage device including a volatile memory, the operating method comprising:

compressing first write data at a first rate to generate first compressed data;

dividing a plurality of physical areas included in the volatile memory into first physical areas and second physical areas;

storing the first compressed data in the first physical areas;

storing first logical information indicating an area storing the first compressed data in a first selected area of the second physical areas;

compressing second write data at a second rate to generate second compressed data;

storing the second compressed data in the first physical areas;

storing second logical information indicating an area storing the second compressed data in a second selected area of the second physical areas;

searching for the first logical information in the first selected area; and searching for the second logical information in the second selected area.

13. The operating method of claim 12, further comprising:

setting some of a current number of free areas as management areas to store free area information on the free areas that are available for storing data, among the first physical areas; and managing the management areas in a form of a linked list.

14. The operating method of claim 13, wherein the storing of the first compressed data comprises:

selecting a first storage area from the free areas with reference to the free area information;

storing the first compressed data in the selected first storage area;

generating the first logical information indicating the first storage area;

storing the first logical information in the first selected area; and invalidating, from the management area, information corresponding to the first storage area, among the free area information.

15. The operating method of claim 14, wherein the storing of the first compressed data further comprises:

invalidating each of the first logical information and the first compressed data in response to a command requesting invalidation of the first logical information;

switching the first storage area into the free area; and putting the free area into the free area information after invalidation.

16. The operating method of claim 14, wherein the storing of the second compressed data comprises:

selecting a second storage area from the free areas with reference to the free area information; and storing the second compressed data in the selected second storage area;

generating the second logical information indicating the second storage area and storing the second logical information in the second selected area; and invalidating, from the management area, information corresponding to the second storage area, among the free area information.

17. The operating method of claim 16, wherein the storing of the second compressed data further comprises:

invalidating each of the second logical information and the second compressed data in response to a command requesting invalidation of the second logical information;

switching the second storage area into the free area; and putting the free area into the free area information after invalidation.

18. The operating method of claim 16, wherein the managing of the management areas comprises:

checking the current number of the free areas among the first physical areas; and varying the number of areas to be set as the management areas, among the current number of the free areas, according to the checked current number of free areas.

19. The operating method of claim 18, wherein, when all information stored in a first management area set as a header in a form of a linked list, among the management areas is invalidated, managing the management areas comprises:

setting, as a new header, a second management area set as a next in the first management area;

switching the first management area into the free area; and putting the free area into the free area information.

20. The operating method of claim 19, wherein the storage device further includes an internal memory having a relatively higher operating speed than the volatile memory, physically divided, and allocated with a space for storing a free area queue, and wherein the operating method further comprises moving partial information of the free area information to the free area queue to manage the moved information.

21. The operating method of claim 20, further comprising:

moving the partial information to the free area queue;

switching an area storing the partial information, among the first physical areas set as the management areas, into the free area;

moving information on the switched free area to the free area queue; and managing the moved information together with the partial information.

22. The operating method of claim 12, wherein the control operation circuit varies a ratio of the first physical areas and the second physical areas among the plurality of physical areas.

* * * * *